(12) United States Patent
Dutta et al.

(10) Patent No.: US 11,968,736 B2
(45) Date of Patent: Apr. 23, 2024

(54) DISCONTINUOUS TRANSMISSION AND DISCONTINUOUS RECEPTION CONFIGURATIONS FOR SIDELINK COMMUNICATIONS

(71) Applicant: QUALCOMM Incorporated, San Diego, CA (US)

(72) Inventors: Sourjya Dutta, San Diego, CA (US); Kapil Gulati, Belle Mead, NJ (US); Shuanshuan Wu, San Diego, CA (US); Anantharaman Balasubramanian, San Diego, CA (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/179,367

(22) Filed: Feb. 18, 2021

(65) Prior Publication Data

US 2021/0267008 A1    Aug. 26, 2021

Related U.S. Application Data

(60) Provisional application No. 62/979,985, filed on Feb. 21, 2020.

(51) Int. Cl.
*H04W 76/28* (2018.01)
(52) U.S. Cl.
CPC .................................. *H04W 76/28* (2018.02)
(58) Field of Classification Search
None
See application file for complete search history.

(56) References Cited

U.S. PATENT DOCUMENTS

2015/0327032 A1* 11/2015 Hedman ............... H04W 76/25
370/329
2016/0366645 A1* 12/2016 Song ................. H04W 52/0229
(Continued)

FOREIGN PATENT DOCUMENTS

WO    WO-2018083381 A1 *  5/2018
WO    WO-2021003693 A1 *  1/2021  .............. H04W 4/40
WO    WO-2021119474 A1 *  6/2021  ........ H04W 72/0406

OTHER PUBLICATIONS

Alcatel-Lucent, et al., "TP on Cell DTX", 3GPP Draft, 3GPP TSG-RAN WG1 Meeting #61, R1-103320, 3rd Generation Partnership Project (3GPP), Mobile Competence Centre, 650, Route Des Lucioles, F-06921, Sophia-Antipolis Cedex, France, vol. RAN WG1, No. Montreal, Canada, May 10, 2010, May 28, 2010 (May 28, 2010), XP050420466, 2 Pages, [retrieved on May 28, 2010] p. 1.

(Continued)

*Primary Examiner* — Jamaal Henson
(74) *Attorney, Agent, or Firm* — Holland & Hart LLP/QUALCOMM Incorporated

(57) ABSTRACT

Methods, systems, and devices for wireless communications are described. A communication device supports sidelink communications, including device-to-device (D2D) communications and vehicle-based communications. The communication device receives, from another device, a discontinuous transmission (DTX) configuration for a sidelink connection between the communications device and the other device. Based on the received DTX configuration, the communications device determines a discontinuous reception (DRX) configuration and transmit, to the other device, the determined DRX configuration. The devices experience power savings, among other results according to the DTX configuration or the DRX configuration.

40 Claims, 17 Drawing Sheets

(56) References Cited

U.S. PATENT DOCUMENTS

| | | | | |
|---|---|---|---|---|
| 2018/0324694 A1 | 11/2018 | Uchiyama | | |
| 2020/0059281 A1* | 2/2020 | Grant | ............... | H04B 7/088 |
| 2020/0374857 A1* | 11/2020 | Zeng | ............... | H04W 72/20 |
| 2021/0045178 A1* | 2/2021 | Kung | ............... | H04W 76/18 |
| 2021/0068189 A1* | 3/2021 | Hahn | ............... | H04W 76/36 |
| 2021/0075552 A1* | 3/2021 | Huang | ............... | H04W 64/00 |
| 2022/0232667 A1* | 7/2022 | Back | ............... | H04W 76/28 |
| 2022/0361284 A1* | 11/2022 | Liu | ............... | H04W 76/28 |

OTHER PUBLICATIONS

International Search Report and Written Opinion—PCT/US2021/018792—ISA/EPO—dated Jun. 1, 2021 (202351WO).
Mediatek Inc: "Small Cell PHY Fast Switch", 3GPP Draft, 3GPP TSG-RAN2 #87 Meeting, R2-143408, DISC Small Cell PHY Fast Switch, 3rd Generation Partnership Project (3GPP), Mobile Competence Centre, 650, Route Des Lucioles, F-06921 Sophia-Antipolis Cedex, France, vol. RAN WG2, No. Dresden, Germany, Aug. 18, 2014-Aug. 22, 2014 Aug. 8, 2014 (Aug. 8, 2014), XP050819638, 4 Pages, Retrieved from the Internet: URL:http://www.3gpp.org/ftp/tsg_ran/WG2_RL2/TSGR2_87/Docs/ [retrieved on Aug. 8, 2014] p. 3, paragraph 2.3.

* cited by examiner

DISCONTINUOUS TRANSMISSION AND DISCONTINUOUS RECEPTION CONFIGURATIONS FOR SIDELINK COMMUNICATIONS

CROSS REFERENCE

The present application for patent claims the benefit of U.S. Provisional Patent Application No. 62/979,985 by DUTTA et al., entitled "DISCONTINUOUS TRANSMISSION AND DISCONTINUOUS RECEPTION CONFIGURATIONS FOR SIDELINK COMMUNICATIONS," filed Feb. 21, 2020, assigned to the assignee hereof, and expressly incorporated by reference herein.

INTRODUCTION

The following relates to wireless communications and more specifically to configurations for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems, such as 4G and 5G systems, may support sidelink communications between multiple communication devices. Examples of sidelink communications may include, but are not limited to, device-to-device (D2D) communications, vehicle-based communications, which may also be referred to as vehicle-to-everything (V2X) communications systems, vehicle-to-vehicle (V2V) communications systems, cellular V2X (C-V2X) communications systems, and the like. As demand for communication efficiency increases, it may be desirable for some wireless communications systems, such as 4G and 5G systems, to provide higher reliability and lower latency sidelink operations to sidelink communications, among other examples.

SUMMARY

A method for wireless communications at a first device is described. The method may include receiving, from a second device, a discontinuous transmission configuration for a sidelink connection between the first device and the second device and transmitting, to the second device, a discontinuous reception configuration for the sidelink connection, the discontinuous reception configuration based on the discontinuous transmission configuration.

An apparatus for wireless communications at a first device is described. The apparatus may include a processor and a memory coupled to the processor. The processor and memory may be configured to receive, from a second device, a discontinuous transmission configuration for a sidelink connection between the first device and the second device and transmit, to the second device, a discontinuous reception configuration for the sidelink connection, the discontinuous reception configuration based on the discontinuous transmission configuration.

Another apparatus for wireless communications at a first device is described. The apparatus may include means for receiving, from a second device, a discontinuous transmission configuration for a sidelink connection between the first device and the second device and means for transmitting, to the second device, a discontinuous reception configuration for the sidelink connection, the discontinuous reception configuration based on the discontinuous transmission configuration.

A non-transitory computer-readable medium storing code for wireless communications at a first device is described. The code may include instructions executable by a processor to receive, from a second device, a discontinuous transmission configuration for a sidelink connection between the first device and the second device and transmit, to the second device, a discontinuous reception configuration for the sidelink connection, the discontinuous reception configuration based on the discontinuous transmission configuration.

Some examples of the method, apparatuses, and non-transitory computer-readable medium described herein may further include operations, features, means, or instructions for receiving, from a third device, a second discontinuous transmission configuration for a second sidelink connection between the first device and the third device.

Some examples of the method, apparatuses, and non-transitory computer-readable medium described herein may further include operations, features, means, or instructions for determining a union of the discontinuous transmission configuration, for the sidelink connection between the first device and the second device, and the second discontinuous transmission configuration, for the second sidelink connection between the first device and the third device and where determining the discontinuous reception configuration may be based on the union, the discontinuous reception configuration including a pattern of one or more discontinuous receptions cycles associated with the sidelink connection between the first device and the second device or the second sidelink connection between the first device and the third device, or both.

In some examples of the method, apparatuses, and non-transitory computer-readable medium described herein, the discontinuous transmission configuration may be exclusively for the sidelink connection.

Some examples of the method, apparatuses, and non-transitory computer-readable medium described herein may further include operations, features, means, or instructions for transmitting, to the second device, a request message including a request to adjust a parameter associated with the discontinuous transmission configuration, where the parameter includes one or more of a discontinuous transmission period, a discontinuous transmission active duration, or a discontinuous transmission offset, or any combination thereof and where determining the discontinuous reception configuration may be based on the request to adjust the parameter associated with the discontinuous transmission configuration.

Some examples of the method, apparatuses, and non-transitory computer-readable medium described herein may further include operations, features, means, or instructions for receiving, from the second device, a response message, related to the request to adjust the parameter associated with the discontinuous transmission configuration, based on the request message and where determining the discontinuous reception configuration may be based on the response message.

In some examples of the method, apparatuses, and non-transitory computer-readable medium described herein, the response message indicates one or more of an adjusted discontinuous transmission period, an adjusted discontinuous transmission active duration, or an adjusted discontinuous transmission offset, or any combination thereof, and the response message indicates a cause for rejecting the request to adjust the parameter associated with the discontinuous transmission configuration.

Some examples of the method, apparatuses, and non-transitory computer-readable medium described herein may further include operations, features, means, or instructions for receiving a set of discontinuous transmission configurations from a set of devices, including the second device, for a set of sidelink connections, including the sidelink connection between the first device and the second device.

Some examples of the method, apparatuses, and non-transitory computer-readable medium described herein may further include operations, features, means, or instructions for determining a subset of sidelink connections of the set of sidelink connections corresponding to a same directional receive beam, the subset of sidelink connections including the sidelink connection between the first device and the second device and where determining the discontinuous reception configuration may be based on a union of the discontinuous transmission configuration, for the sidelink connection between the first device and the second device, and one or more other discontinuous transmission configurations, for a corresponding sidelink connection of the subset of sidelink connections between the first device and a corresponding other device associated with the corresponding sidelink connection.

Some examples of the method, apparatuses, and non-transitory computer-readable medium described herein may further include operations, features, means, or instructions for determining the subset of sidelink connections of the set of sidelink connections corresponding to the same directional receive beam may be based on a receiver spatial configuration associated with the first device.

In some examples of the method, apparatuses, and non-transitory computer-readable medium described herein, and the method, apparatuses, and non-transitory computer-readable medium may include further operations, features, means, or instructions for a different peak quality-of-service metric of a corresponding discontinuous transmission configuration of the one or more other discontinuous transmission configurations, a different traffic throughput metric of the corresponding discontinuous transmission configuration of the one or more other discontinuous transmission configurations, a different spectral efficiency metric of the corresponding discontinuous transmission configuration of the one or more other discontinuous transmission configurations, a different reference signal received power metric of the corresponding discontinuous transmission configuration of the one or more other discontinuous transmission configurations, and a different reference signal received quality metric of the corresponding discontinuous transmission configuration of the one or more other discontinuous transmission configurations, or any combination thereof.

Some examples of the method, apparatuses, and non-transitory computer-readable medium described herein may further include operations, features, means, or instructions for transmitting, to a third device, a request message including a request to adjust a parameter associated with a corresponding discontinuous transmission configuration associated with the third device, where the parameter includes one or more of a discontinuous transmission period, a discontinuous transmission active duration, or a discontinuous transmission offset, or any combination thereof and where determining the discontinuous reception configuration may be based on the request to adjust the parameter associated with the corresponding discontinuous transmission configuration associated with the third device.

Some examples of the method, apparatuses, and non-transitory computer-readable medium described herein may further include operations, features, means, or instructions for transmitting the discontinuous transmission configuration and the discontinuous reception configuration to a set of devices, including the second device, for a set of sidelink connections, including the sidelink connection between the first device and the second device.

In some examples of the method, apparatuses, and non-transitory computer-readable medium described herein, transmitting the discontinuous reception configuration may include operations, features, means, or instructions for transmitting the discontinuous transmission configuration and the discontinuous reception configuration to the set of devices, including the second device, for the set of sidelink connections, including the sidelink connection between the first device and the second device, based on a corresponding device identifier associated with each device of the set of devices.

A method for wireless communications at a first device is described. The method may include transmitting, to a second device, a discontinuous transmission configuration for a sidelink connection between the first device and the second device and receiving, from the second device, a discontinuous reception configuration for the sidelink connection between the first device and the second device based on the discontinuous transmission configuration.

An apparatus for wireless communications at a first device is described. The apparatus may include a processor and a memory coupled to the processor. The processor and memory may be configured to transmit, to a second device, a discontinuous transmission configuration for a sidelink connection between the first device and the second device and receive, from the second device, a discontinuous reception configuration for the sidelink connection between the first device and the second device based on the discontinuous transmission configuration.

Another apparatus for wireless communications at a first device is described. The apparatus may include means for transmitting, to a second device, a discontinuous transmission configuration for a sidelink connection between the first device and the second device and means for receiving, from the second device, a discontinuous reception configuration for the sidelink connection between the first device and the second device based on the discontinuous transmission configuration.

A non-transitory computer-readable medium storing code for wireless communications at a first device is described. The code may include instructions executable by a processor to transmit, to a second device, a discontinuous transmission configuration for a sidelink connection between the first device and the second device and receive, from the second device, a discontinuous reception configuration for the sidelink connection between the first device and the second device based on the discontinuous transmission configuration.

In some examples of the method, apparatuses, and non-transitory computer-readable medium described herein, the discontinuous transmission configuration may be exclusively for the sidelink connection.

Some examples of the method, apparatuses, and non-transitory computer-readable medium described herein may further include operations, features, means, or instructions for receiving, from the second device, a request message including a request to adjust a parameter associated with the discontinuous transmission configuration, where the parameter includes one or more of a discontinuous transmission period, a discontinuous transmission active duration, or a discontinuous transmission offset, or any combination thereof.

Some examples of the method, apparatuses, and non-transitory computer-readable medium described herein may further include operations, features, means, or instructions for transmitting, to the second device, a response message, related to the request to adjust the parameter associated with the discontinuous transmission configuration, based on the request message.

In some examples of the method, apparatuses, and non-transitory computer-readable medium described herein, the response message indicates one or more of an adjusted discontinuous transmission period, an adjusted discontinuous transmission active duration, or an adjusted discontinuous transmission offset, or any combination thereof.

In some examples of the method, apparatuses, and non-transitory computer-readable medium described herein, the response message indicates a cause for rejecting the request to adjust the parameter associated with the discontinuous transmission configuration.

In some examples of the method, apparatuses, and non-transitory computer-readable medium described herein, transmitting the discontinuous transmission configuration may include operations, features, means, or instructions for transmitting the discontinuous transmission configuration based on a sidelink connection procedure.

In some examples of the method, apparatuses, and non-transitory computer-readable medium described herein, the sidelink connection procedure includes a sidelink connection setup procedure.

In some examples of the method, apparatuses, and non-transitory computer-readable medium described herein, the sidelink connection setup procedure includes a unicast radio resource control sidelink connection setup procedure.

In some examples of the method, apparatuses, and non-transitory computer-readable medium described herein, transmitting the discontinuous transmission configuration may include operations, features, means, or instructions for transmitting the discontinuous transmission configuration in a radio resource control configuration message during the unicast radio resource control sidelink connection setup procedure.

In some examples of the method, apparatuses, and non-transitory computer-readable medium described herein, the discontinuous transmission configuration includes a pattern of one or more discontinuous transmission cycles.

In some examples of the method, apparatuses, and non-transitory computer-readable medium described herein, the discontinuous transmission configuration including the pattern of the one or more discontinuous transmission cycles includes a slot offset, a frame offset, a periodicity, or an active duration for transmission of sidelink communications over the sidelink connection, or any combination thereof.

In some examples of the method, apparatuses, and non-transitory computer-readable medium described herein, the discontinuous reception configuration includes a pattern of one or more discontinuous reception cycles.

In some examples of the method, apparatuses, and non-transitory computer-readable medium described herein, the discontinuous reception configuration including the pattern of the one or more discontinuous reception cycles includes a slot offset, a frame offset, a periodicity, or an active duration for reception of sidelink communications over the sidelink connection, or any combination thereof.

A method of wireless communications at a first device is described. The method may include receiving, from a second device, a discontinuous transmission (DTX) configuration for a sidelink connection between the first device and the second device, determining a discontinuous reception (DRX) configuration based on the DTX configuration, and transmitting, to the second device, the DRX configuration for the sidelink connection.

A first apparatus for wireless communications is described. The first apparatus may include a processor and memory coupled with the processor. The processor and memory may be configured to receive, from a second apparatus, a DTX configuration for a sidelink connection between the first apparatus and the second apparatus, determine a DRX configuration based on the DTX configuration, and transmit, to the second apparatus, the DRX configuration for the sidelink connection.

Another first apparatus for wireless communications is described. The first apparatus may include means for receiving, from a second apparatus, a DTX configuration for a sidelink connection between the first apparatus and the second apparatus, determining a DRX configuration based on the DTX configuration, and transmitting, to the second device, the DRX configuration for the sidelink connection.

A non-transitory computer-readable medium storing code for wireless communications at a first device is described. The code may include instructions executable by a processor to receive, from a second device, a DTX configuration for a sidelink connection between the first device and the second device, determine a DRX configuration based on the DTX configuration, and transmit, to the second device, the DRX configuration for the sidelink connection.

In some examples of the method, apparatuses, and non-transitory computer-readable medium described herein, the DTX configuration may be exclusively for the sidelink connection.

Some examples of the method, apparatuses, and non-transitory computer-readable medium described herein may further include operations, features, means, or instructions for receiving, from a third device, a second DTX configuration for a second sidelink connection between the first device and the third device.

Some examples of the method, apparatuses, and non-transitory computer-readable medium described herein may further include operations, features, means, or instructions for determining a union of the DTX configuration, for the sidelink connection between the first device and the second device, and the second DTX configuration, for the second sidelink connection between the first device and the third device, where determining the DRX configuration may be based on the union, the DRX configuration including a pattern of one or more DRXs cycles associated with the sidelink connection between the first device and the second device or the second sidelink connection between the first device and the third device, or both.

Some examples of the method, apparatuses, and non-transitory computer-readable medium described herein may further include operations, features, means, or instructions for receiving a set of DTX configurations from a set of devices, including the second device, for a set of sidelink connections, including the sidelink connection between the first device and the second device.

Some examples of the method, apparatuses, and non-transitory computer-readable medium described herein may further include operations, features, means, or instructions for determining a subset of sidelink connections of the set of sidelink connections corresponding to a same directional receive beam, the subset of sidelink connections including the sidelink connection between the first device and the second device, where determining the DRX configuration may be based on a union of the DTX configuration, for the sidelink connection between the first device and the second device, and one or more other DTX configurations, for a corresponding sidelink connection of the subset of sidelink connections between the first device and a corresponding other device associated with the corresponding sidelink connection.

Some examples of the method, apparatuses, and non-transitory computer-readable medium described herein may further include operations, features, means, or instructions for determining the subset of sidelink connections of the set of sidelink connections corresponding to the same directional receive beam may be based on a receiver spatial configuration associated with the first device.

In some examples of the method, apparatuses, and non-transitory computer-readable medium described herein, the DRX configuration includes a pattern of one or more DRXs cycles, each DRX cycle of the pattern corresponding to a different peak quality-of-service metric of a corresponding DTX configuration of the one or more other DTX configurations.

In some examples of the method, apparatuses, and non-transitory computer-readable medium described herein, the DRX configuration includes a pattern of one or more DRXs cycles, each DRX cycle of the pattern corresponding to a different traffic throughput metric of a corresponding DTX configuration of the one or more other DTX configurations.

In some examples of the method, apparatuses, and non-transitory computer-readable medium described herein, the DRX configuration includes a pattern of one or more DRXs cycles, each DRX cycle of the pattern corresponding to a different spectral efficiency metric of a corresponding DTX configuration of the one or more other DTX configurations.

In some examples of the method, apparatuses, and non-transitory computer-readable medium described herein, the DRX configuration includes a pattern of one or more DRXs cycles, each DRX cycle of the pattern corresponding to a different reference signal received power metric of a corresponding DTX configuration of the one or more other DTX configurations.

In some examples of the method, apparatuses, and non-transitory computer-readable medium described herein, the DRX configuration includes a pattern of one or more DRXs cycles, each DRX cycle of the pattern corresponding to a different reference signal received quality metric of a corresponding DTX configuration of the one or more other DTX configurations.

Some examples of the method, apparatuses, and non-transitory computer-readable medium described herein may further include operations, features, means, or instructions for transmitting, to the second device, a request message including a request to adjust a parameter associated with the DTX configuration, where the parameter includes one or more of a DTX period, a DTX active duration, or a DTX offset, or any combination thereof, where determining the DRX configuration may be based on the request to adjust the parameter associated with the DTX configuration.

Some examples of the method, apparatuses, and non-transitory computer-readable medium described herein may further include operations, features, means, or instructions for receiving, from the second device, a response message, related to the request to adjust the parameter associated with the DTX configuration, based on the request message, where determining the DRX configuration may be based on the response message.

In some examples of the method, apparatuses, and non-transitory computer-readable medium described herein, the response message indicates one or more of an adjusted DTX period, an adjusted DTX active duration, or an adjusted DTX offset, or any combination thereof.

In some examples of the method, apparatuses, and non-transitory computer-readable medium described herein, the response message indicates a cause for rejecting the request to adjust the parameter associated with the DTX configuration.

Some examples of the method, apparatuses, and non-transitory computer-readable medium described herein may further include operations, features, means, or instructions for transmitting, to a third device, a request message including a request to adjust a parameter associated with a corresponding DTX configuration associated with the third device, where the parameter includes one or more of a DTX period, a DTX active duration, or a DTX offset, or any combination thereof, where determining the DRX configuration may be based on the request to adjust the parameter associated with the corresponding DTX configuration associated with the third device.

Some examples of the method, apparatuses, and non-transitory computer-readable medium described herein may further include operations, features, means, or instructions for transmitting the DTX configuration and the DRX configuration to a set of devices, including the second device, for a set of sidelink connections, including the sidelink connection between the first device and the second device.

In some examples of the method, apparatuses, and non-transitory computer-readable medium described herein, transmitting the DRX configuration may include operations, features, means, or instructions for transmitting the DTX configuration and the DRX configuration to the set of devices, including the second device, for the set of sidelink connections, including the sidelink connection between the first device and the second device, based on a corresponding device identifier associated with each device of the set of devices.

Some examples of the method, apparatuses, and non-transitory computer-readable medium described herein may further include operations, features, means, or instructions for receiving a set of DRX configurations from a set of devices, including the second device, for a set of sidelink connections, including the sidelink connection between the first device and the second device.

Some examples of the method, apparatuses, and non-transitory computer-readable medium described herein may further include operations, features, means, or instructions for adjusting a pattern of one or more DRX cycles based on the received DTX configuration from the second device for the sidelink connection.

Some examples of the method, apparatuses, and non-transitory computer-readable medium described herein may further include operations, features, means, or instructions for transmitting, an indication of the adjusted pattern, to the set of devices for each device of the set of devices to align a DTX occasion, where the first device may have a corresponding sidelink connection with each device of the set of devices.

Some examples of the method, apparatuses, and non-transitory computer-readable medium described herein may further include operations, features, means, or instructions for adjusting a pattern of one or more DRX cycles associated with the DRX configuration based on a trigger, and transmitting an update message to the second device based on the adjusting, the update message including a RRC update message including a DTX offset adjustment request.

In some examples of the method, apparatuses, and non-transitory computer-readable medium described herein, the trigger includes a new sidelink connection or a new sidelink application, or both.

Some examples of the method, apparatuses, and non-transitory computer-readable medium described herein may further include operations, features, means, or instructions for identifying capability information, and transmitting, to the second device, a message including capability information associated with the first device, the message including an RRC connection message.

Some examples of the method, apparatuses, and non-transitory computer-readable medium described herein may further include operations, features, means, or instructions for enabling a DRX reconfiguration mode based on the capability information.

Some examples of the method, apparatuses, and non-transitory computer-readable medium described herein may further include operations, features, means, or instructions for monitoring one or more DRX cycles based on the DRX configuration, and activating a DRX timer based on the monitoring.

Some examples of the method, apparatuses, and non-transitory computer-readable medium described herein may further include operations, features, means, or instructions for determining an absence of data from the second device during the one or more DRX cycles based on the monitoring, where activating the DRX timer may be based on the absence of data from the second device during the one or more DRX cycles.

Some examples of the method, apparatuses, and non-transitory computer-readable medium described herein may further include operations, features, means, or instructions for adjusting a pattern of one or more DRX cycles associated with the DRX configuration based on the DRX timer lapsing.

In some examples of the method, apparatuses, and non-transitory computer-readable medium described herein, adjusting the pattern of the one or more DRX cycles may include operations, features, means, or instructions for modifying a length of the one or more DRX cycles.

Some examples of the method, apparatuses, and non-transitory computer-readable medium described herein may further include operations, features, means, or instructions for transmitting, to the second device, an indication of the modified length of the one or more DRX cycles.

In some examples of the method, apparatuses, and non-transitory computer-readable medium described herein, receiving the DTX configuration may include operations, features, means, or instructions for receiving the DTX configuration based on a sidelink connection procedure.

In some examples of the method, apparatuses, and non-transitory computer-readable medium described herein, the sidelink connection procedure includes a sidelink connection setup procedure.

In some examples of the method, apparatuses, and non-transitory computer-readable medium described herein, the sidelink connection setup procedure includes a unicast RRC sidelink connection setup procedure.

In some examples of the method, apparatuses, and non-transitory computer-readable medium described herein, receiving the DTX configuration may include operations, features, means, or instructions for receiving the DTX configuration in an RRC configuration message during the unicast RRC sidelink connection setup procedure.

In some examples of the method, apparatuses, and non-transitory computer-readable medium described herein, the DTX configuration includes a pattern of one or more DTX cycles.

In some examples of the method, apparatuses, and non-transitory computer-readable medium described herein, the DTX configuration including the pattern of the one or more DTX cycles includes a slot offset, a frame offset, a periodicity, or an active duration for transmission of sidelink communications over the sidelink connection, or any combination thereof.

In some examples of the method, apparatuses, and non-transitory computer-readable medium described herein, the DRX configuration includes a pattern of one or more DRX cycles.

In some examples of the method, apparatuses, and non-transitory computer-readable medium described herein, the DRX configuration including the pattern of the one or more DRX cycles includes a slot offset, a frame offset, a periodicity, or an active duration for reception of sidelink communications over the sidelink connection, or any combination thereof.

Some examples of the method, apparatuses, and non-transitory computer-readable medium described herein may further include operations, features, means, or instructions for identifying, based on the DTX configuration, a DTX period, a DTX active duration, or a DTX offset, or any combination thereof, where determining the DRX configuration may be based on the DTX period, the DTX active duration, or the DTX offset, or any combination thereof.

In some examples of the method, apparatuses, and non-transitory computer-readable medium described herein, one or more of the DTX period, the DTX active duration, or the DTX offset, may be based on a traffic load associated with the sidelink connection.

In some examples of the method, apparatuses, and non-transitory computer-readable medium described herein, one or more of the DTX period, the DTX active duration, or the DTX offset, may be based on a data radio bearer configuration associated with the sidelink connection.

In some examples of the method, apparatuses, and non-transitory computer-readable medium described herein, the wireless communications include sidelink communications.

In some examples of the method, apparatuses, and non-transitory computer-readable medium described herein, the sidelink communications includes V2X communications.

Some examples of the method, apparatuses, and non-transitory computer-readable medium described herein may further include operations, features, means, or instructions for receiving the DTX configuration for the sidelink connection may be based on a broadcast connection associated with the second device.

In some examples of the method, apparatuses, and non-transitory computer-readable medium described herein, the DTX configuration may be common to all sidelink connections associated with the broadcast connection associated with the second device, where the DTX configuration may be common to at least the sidelink connection between the first device and the second device and a second sidelink connection between a third device and the second device.

In some examples of the method, apparatuses, and non-transitory computer-readable medium described herein, one or more DTX configurations vary over one or more sidelink connections associated with the broadcast connection associated with the second device based on a unicast traffic load associated with the one or more sidelink connections.

Some examples of the method, apparatuses, and non-transitory computer-readable medium described herein may further include operations, features, means, or instructions for receiving the DTX configuration for the sidelink connection may be based on a groupcast connection associated with the second device.

In some examples of the method, apparatuses, and non-transitory computer-readable medium described herein, the DTX configuration may be common to all sidelink connections associated with the groupcast connection associated with the second device, where the DTX configuration may be common to at least the sidelink connection between the first device and the second device and a second sidelink connection between a third device and the second device.

In some examples of the method, apparatuses, and non-transitory computer-readable medium described herein, one or more DTX configurations vary over one or more sidelink connections associated with the groupcast connection associated with the second device based on a unicast traffic load associated with the one or more sidelink connections.

A method of wireless communication at a first device is described. The method may include determining a DTX configuration for a sidelink connection between the first device and a second device, transmitting, to the second device, the DTX configuration, and receiving, from the second device, a DRX configuration for the sidelink connection between the first device and the second device based on the DTX configuration.

A first apparatus for wireless communication is described. The first apparatus may include a processor and memory coupled with the processor. The processor and memory may be configured to determine a DTX configuration for a sidelink connection between the first apparatus and a second apparatus, transmit, to the second apparatus, the DTX configuration, and receive, from the second apparatus, a DRX configuration for the sidelink connection between the first apparatus and the second apparatus based on the DTX configuration.

Another first apparatus for wireless communication is described. The first apparatus may include means for determining a DTX configuration for a sidelink connection between the first apparatus and a second apparatus, transmitting, to the second apparatus, the DTX configuration, and receiving, from the second apparatus, a DRX configuration for the sidelink connection between the first apparatus and the second apparatus based on the DTX configuration.

A non-transitory computer-readable medium storing code for wireless communication at a first device is described. The code may include instructions executable by a processor to determine a DTX configuration for a sidelink connection between the first device and a second device, transmit, to the second device, the DTX configuration, and receive, from the second device, a DRX configuration for the sidelink connection between the first device and the second device based on the DTX configuration.

In some examples of the method, apparatuses, and non-transitory computer-readable medium described herein, the DTX configuration may be exclusively for the sidelink connection.

Some examples of the method, apparatuses, and non-transitory computer-readable medium described herein may further include operations, features, means, or instructions for receiving, from the second device, a request message including a request to adjust a parameter associated with the DTX configuration, where the parameter includes one or more of a DTX period, a DTX active duration, or a DTX offset, or any combination thereof.

Some examples of the method, apparatuses, and non-transitory computer-readable medium described herein may further include operations, features, means, or instructions for transmitting, to the second device, a response message, related to the request to adjust the parameter associated with the DTX configuration, based on the request message.

In some examples of the method, apparatuses, and non-transitory computer-readable medium described herein, the response message indicates one or more of an adjusted DTX period, an adjusted DTX active duration, or an adjusted DTX offset, or any combination thereof.

In some examples of the method, apparatuses, and non-transitory computer-readable medium described herein, the response message indicates a cause for rejecting the request to adjust the parameter associated with the DTX configuration.

In some examples of the method, apparatuses, and non-transitory computer-readable medium described herein, transmitting the DTX configuration may include operations, features, means, or instructions for transmitting the DTX configuration based on a sidelink connection procedure.

In some examples of the method, apparatuses, and non-transitory computer-readable medium described herein, the sidelink connection procedure includes a sidelink connection setup procedure.

In some examples of the method, apparatuses, and non-transitory computer-readable medium described herein, the sidelink connection setup procedure includes a unicast RRC sidelink connection setup procedure.

In some examples of the method, apparatuses, and non-transitory computer-readable medium described herein, transmitting the DTX configuration may include operations, features, means, or instructions for transmitting the DTX configuration in an RRC configuration message during the unicast RRC sidelink connection setup procedure.

In some examples of the method, apparatuses, and non-transitory computer-readable medium described herein, the DTX configuration includes a pattern of one or more DTX cycles.

In some examples of the method, apparatuses, and non-transitory computer-readable medium described herein, the DTX configuration including the pattern of the one or more DTX cycles includes a slot offset, a frame offset, a periodicity, or an active duration for transmission of sidelink communications over the sidelink connection, or any combination thereof.

In some examples of the method, apparatuses, and non-transitory computer-readable medium described herein, the DRX configuration includes a pattern of one or more DRX cycles.

In some examples of the method, apparatuses, and non-transitory computer-readable medium described herein, the DRX configuration including the pattern of the one or more DRX cycles includes a slot offset, a frame offset, a periodicity, or an active duration for reception of sidelink communications over the sidelink connection, or any combination thereof.

In some examples of the method, apparatuses, and non-transitory computer-readable medium described herein, the DTX configuration includes a DTX period, a DTX active duration, or a DTX offset, or any combination thereof.

In some examples of the method, apparatuses, and non-transitory computer-readable medium described herein, one or more of the DTX period, the DTX active duration, or the DTX offset, may be based on a traffic load associated with the sidelink connection.

In some examples of the method, apparatuses, and non-transitory computer-readable medium described herein, one or more of the DTX period, the DTX active duration, or the DTX offset, may be based on a data radio bearer configuration associated with the sidelink connection.

In some examples of the method, apparatuses, and non-transitory computer-readable medium described herein, the wireless communications include sidelink communications.

In some examples of the method, apparatuses, and non-transitory computer-readable medium described herein, the sidelink communications includes V2X communications.

In some examples of the method, apparatuses, and non-transitory computer-readable medium described herein, transmitting the DTX configuration may include operations, features, means, or instructions for broadcasting the DTX configuration to a set of devices, including the second device, based on a broadcast connection associated with the set of devices.

In some examples of the method, apparatuses, and non-transitory computer-readable medium described herein, the DTX configuration may be common to all sidelink connections associated with the broadcast connection associated with the set of devices.

In some examples of the method, apparatuses, and non-transitory computer-readable medium described herein, the DTX configuration may be common to at least the sidelink connection between the first device and the second device and a second sidelink connection between a third device and the first device.

In some examples of the method, apparatuses, and non-transitory computer-readable medium described herein, one or more DTX configurations vary over one or more sidelink connections associated with the broadcast connection associated with the set of devices based on a unicast traffic load associated with the one or more sidelink connections.

In some examples of the method, apparatuses, and non-transitory computer-readable medium described herein, transmitting the DTX configuration may include operations, features, means, or instructions for transmitting the DTX configuration to a set of devices, including the second device, based on a groupcast connection associated with the set of devices.

In some examples of the method, apparatuses, and non-transitory computer-readable medium described herein, the DTX configuration may be common to all sidelink connections associated with the groupcast connection, where the DTX configuration may be common to at least the sidelink connection between the first device and the second device and a second sidelink connection between a third device and the first device.

In some examples of the method, apparatuses, and non-transitory computer-readable medium described herein, one or more DTX configurations vary over one or more sidelink connections associated with the groupcast connection associated with the set of devices based on a unicast traffic load associated with the one or more sidelink connections.

DETAILED DESCRIPTION

Figure 1:
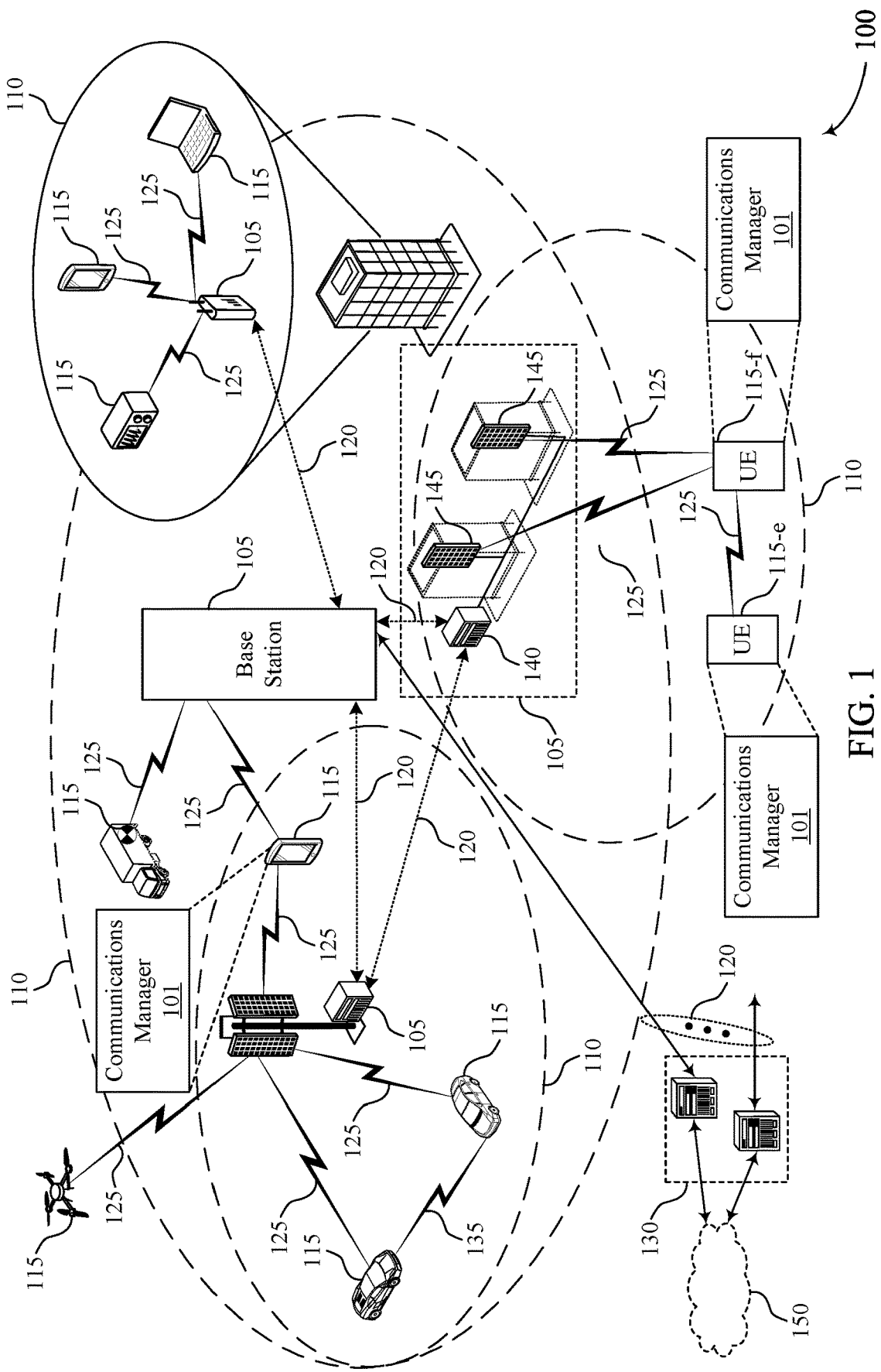
FIGS. 1 through 4 illustrate example of wireless communications systems in accordance with one or more aspects of the present disclosure.

Wireless communications systems may include multiple communication devices such as UEs and base stations, which may provide wireless communication services to the UEs. For example, such base stations may be next-generation NodeBs or giga-NodeBs (either of which may be referred to as a gNB) that may support multiple radio access technologies including 4G systems, such as LTE systems, as well as 5G systems, which may be referred to as NR systems. Some wireless communications systems may also support sidelink communications between multiple UEs. Examples of sidelink communications may include, but are not limited to, D2D communications, vehicle-based communications, which may also be referred to as V2X communications systems, V2V communications systems, etc. As demand for communication efficiency, reliability and latency increases, it may be desirable for wireless communications systems to provide higher reliability and lower latency sidelink operations to sidelink communications, among other examples.

In some examples, wireless communications between a base station and a UE may include DTX operations or DRX operations, or both, to provide power savings at the UE. Unlike wireless communications between a base station and a UE, sidelink communications between multiple UEs may not include DTX operations or DRX operations. With sidelink communications, a first UE may not assume that a second UE (e.g., peer UE) is available to listen at all times for a transmission from the first UE. Accordingly, the first UE may transmit to the second UE a DTX configuration of the first UE to enable the second UE to determine when the first UE may transmit a message. Otherwise, the second UE may remain awake at all times even if the first UE transmits at a relatively infrequent period.

A UE may establish a sidelink connection with one or multiple other UEs in a wireless communications system, for example, such as a V2X communications system. In some examples, the UE may support unicast communications, broadcast communications, or groupcast communications, or a combination therefore. To provide higher reliability and lower latency to sidelink communications, the UE may be configured to support DTX operations or DRX operations, or both. For example, a UE may be configured with a DTX configuration (e.g., receive the DTX configuration or determine the DTX configuration based on a configuration of the UE), or may be configured with a DRX configuration (e.g., receive the DRX configuration or determine the DRX configuration based on a configuration of the UE), or both. In some examples of unicast communications, a UE (e.g., a receiver UE) may receive a DTX configuration from another UE (e.g., a transmitter UE) via a connection (e.g., a sidelink connection), and the DTX configuration may identify a pattern of DTX cycles specific for the UE (e.g., the receiver UE). A DTX cycle may include an active DTX duration (e.g., a period of time when a transmitter of a UE is active or is transmitting), an inactive DTX duration (e.g., a period of time when the transmitter of the UE is inactive or asleep), etc. as described herein. In some cases, a DTX pattern may indicate when a UE may be configured to transmit data/control information (e.g., DTX active duration) and when the transmitter circuitry of the UE is asleep or inactive (e.g., DTX inactive duration).

In some examples of broadcast communications and groupcast communications, a UE (e.g., a transmitter UE) may broadcast or transmit a DTX configuration to all UEs or a group of UEs over multiple connections (e.g., multiple sidelink connections). In such an example, the DTX configuration may thus be common for all the UEs or the group of UEs. While the DTX configuration may be the same for all the UEs or the group of UEs, each of the UEs may, in some examples, have different unicast traffic on a corresponding sidelink connection.

As part of DRX operations, the UE may determine a DRX configuration based on one or multiple received DTX configurations. The DRX configuration identify one or more DRX cycles, which may include an active DRX duration (e.g., a period of time when a receiver of a UE is active or monitoring), an inactive DRX duration (e.g., a period of time when a receiver of the UE is inactive or asleep), etc., as described herein. In some cases, a DRX pattern may indicate when a UE may be configured to receive data/control information (e.g., DRX active duration) and when receiver circuitry of the UE is asleep or inactive (DRX inactive duration). Similarly, in some examples of unicast communications, the UE may transmit the DRX configuration to another UE via a connection (e.g., a sidelink connection), and the DRX configuration may identify a pattern of DRX cycles specific for the UE. In some examples of broadcast communications and groupcast communications, the UE may transmit or broadcast the DRX configuration to all UEs or a group of UEs over multiple connections (e.g., multiple sidelink connections). The DRX configuration may thus be common for all the UEs or the group of UEs. Therefore, by implementing DRX operations and DTX operations with sidelink communications, the associated UEs may experience power savings as a result of providing a DTX configuration or a DRX configuration, or both.

Particular aspects of the subject matter described in this disclosure may be implemented to realize power savings and provide higher reliability and lower latency sidelink operations to sidelink communications. The techniques employed by UEs may provide power savings to the operation of the UEs. For example, operations performed by the UEs may provide power savings to sidelink operations. In some examples, configuring the UEs to support DTX configurations or DRX configurations, or both, for sidelink communications may support decreasing power consumption, increasing spectral efficiency, and, in some examples, may promote increased efficiency for sidelink operations, among other benefits.

Aspects of the disclosure are initially described in the context of wireless communications systems. Aspects of the disclosure are then illustrated by and described with reference to transmission timelines that relate to DTX and DRX configurations for sidelink communications. Aspects of the disclosure are further illustrated by and described with reference to apparatus diagrams, system diagrams, and flowcharts that relate to DTX and DRX configurations for sidelink communications.

FIG. 1 illustrates an example of a wireless communications system 100 in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or commercial applications. The terms ultra-reliable, low-latency, mission critical, and ultra-reliable low-latency may be used interchangeably herein.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to increase link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may increase throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may be a 4G or a 5G system, and may support DRX operations for power saving. A UE 115, in the wireless communications system 100, may support DRX operations to reduce power consumption when the UE 115 has no data for transmission or no expected data for reception. In some examples, the UE 115 may be configured with, or determine, a DRX configuration for DRX operations. The DRX configuration may identify a pattern of one or more DRX cycles, which may include an active DRX duration, an inactive DRX duration, and the like.

During an active DRX duration of a DRX cycle, the UE 115 may wake up and monitor a physical channel (e.g., a physical downlink control channel (PDCCH), a physical downlink shared channel (PDSCH)) to receive various types of communication content (e.g., control information, data). The UE 115 may monitor the physical channel during a monitoring occasion (e.g., a number of slots). In some examples, the UE 115 may wake up and perform a random access procedure (e.g., a random access channel (RACH) procedure) with a base station 105 to receive the various types of communication content from the base station 105. Moreover, during an inactive DRX duration of the DRX cycle, the UE 115 may power-down thereby experience power savings during a DRX cycle.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel (also referred to as a sidelink connection), between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

In some cases, in the wireless communications system 100 (e.g., such as in 4G or 5G systems), the base station 105 may be constantly listening for transmissions from UEs 115 that are within a geographic coverage area 110 of the base station 105. As such, the UE 115 may exclusively support DRX operations because the base station 105 is listening (e.g., always listening) for transmission from the UEs 115. That is, a DTX configuration for the UEs 115 may be unnecessary because the base station 150 is continually listening for transmissions from the UEs 115. However, in some examples, such as in 4G or 5G systems that support sidelink communications, UEs 115 may be configured to support both DTX and DRX operations for sidelink communications to save power. In other words, UEs 115 supporting sidelink communications may support both DTX and DRX operations because UEs 115 in sidelink communications cannot assume that another UE 115 (with which the UEs 115 may have a sidelink connection with) is available (e.g., free, always free) to listen for transmissions from the UEs 115.

The wireless communications system 100 may provide higher reliability and lower latency sidelink operations to sidelink communications, among other examples. UEs 115 may include a communications manager 101 that may manage communications (e.g., sidelink communications) with other UEs 115. The communications manager 101 may be an example of aspects of a communications manager as described in FIGS. 8 through 11. A UE 115 (e.g., a vehicle in a V2X system) may receive, from another UE 115 (e.g., another vehicle in a V2X system), a DTX configuration for a sidelink connection between the UE 115 and the other UE 115. In some examples, the DTX configuration may provide an indication of one or more DTX cycles including active DTX durations, inactive DTX durations, etc. As such, a peer UE 115 (e.g., a receiver UE 115) may know when to expect a transmission over one or more sidelink connections from another peer UE 115 (e.g., a transmitter UE 115). Without the DTX configuration, the peer UE 115 (e.g., the receiver UE 115) may have to continuously stay awake even if the other peer UE 115 (e.g., the transmitter UE 115) has no transmissions for the peer UE 115, thereby wasting resources (e.g., a battery life of the UE 115).

The UE 115 may determine a DRX configuration based on the received DTX configuration, and transmit, to the other UE 115, the DRX configuration for the sidelink connection. In some examples, the DRX configuration may provide an indication of one or more DRX cycles including active DRX durations, inactive DRX durations, etc. By supporting one or more of a DTX configuration or a DRX configuration, or both, for sidelink communications the UEs 115 in the wireless communications system 100 may experience power savings, among other benefits. In other aspects, configuring the UEs 115 to support DTX configurations or DRX configurations, or both, for sidelink communications may support increased spectral efficiency, and, in some examples, may promote increased efficiency for sidelink operations, among other benefits.

Figure 2:
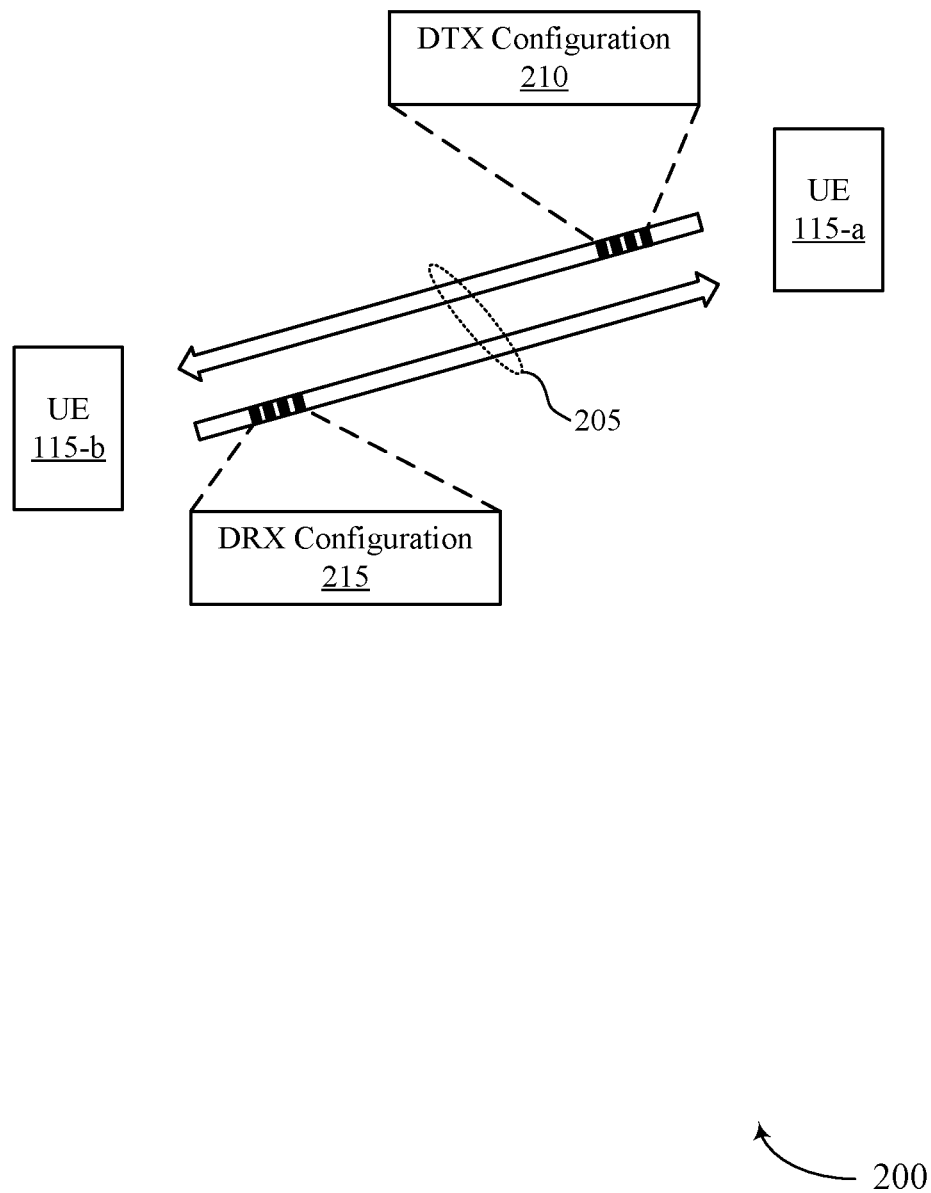

FIG. 2 illustrates an example of a wireless communications system 200 in accordance with one or more aspects of the present disclosure. In some examples, the wireless communications system 200 may implement aspects of the wireless communications system 100. For example, the wireless communications system 200 may support multiple radio access technologies including 4G systems such as LTE systems, LTE-A systems, or LTE-A Pro systems, and 5G systems which may be referred to as NR systems. The wireless communications system 200 may also support sidelink communications between multiple UEs 115, such as between a UE 115-a and a UE 115-b, which may be examples of corresponding devices described with reference to FIG. 1. Examples of sidelink communications may include D2D communications, V2X communications systems, V2V communications systems, and the like. The wireless communications system 200 may also support decreased power consumption and, in some examples, may promote higher reliability and lower latency sidelink communications, among other benefits.

The UE 115-a and the UE 115-b may be configured with multiple antennas, which may be used to employ techniques such as transmit diversity, receive diversity, multiple-input multiple-output communications, or beamforming, or any combination thereof. The antennas of the UE 115-a and the UE 115-b may be located within one or more antenna arrays or antenna panels, which may support multiple-input multiple-output operations or transmit or receive beamforming. The UE 115-a may have an antenna array with a number of rows and columns of antenna ports that the UE 115-a may use to support beamforming of communications (e.g., sidelink communications) with the UE 115-b or multiple other UEs. Likewise, the UE 115-b may have one or more antenna arrays that may support various multiple-input multiple-output or beamforming operations for communications (e.g., sidelink communications) with the UE 115-a or multiple other UEs. Additionally or alternatively, an antenna panel may support radio frequency beamforming for a signal transmitted via one or more antenna ports. The UE 115-a and the UE 115-b may thus be configured to support directional sidelink communications using the multiple antennas.

The UE 115-a or the UE 115-a, or both, in the wireless communications system 200, may support operations to preserve resources (for example, time and frequency resources of the wireless communications system 200), a battery life of the UE 115-a or the UE 115-b, or both, among other examples. In some examples, the UE 115-a or the UE 115-a, or both, may be configured to support operations to provide higher reliability and lower latency sidelink operations to sidelink communications for a sidelink connection 205 between the UE 115-a and the UE 115-b. For example, the UE 115-a or the UE 115-a, or both, may be configured to support DTX operations or DRX operations, or both for sidelink communications for the sidelink connection 205.

The sidelink connection 205 may be an example of a communication channel, such as a sidelink communication channel, between vehicles (e.g., UEs 115). The sidelink communication channel may correspond to a PC5 interface between the UE 115-a and the UE 115-b. The PC5 interface may facilitate direct communications between at least two UEs without involving a network infrastructure (e.g., a base station (e.g., an eNB, a next-generation NodeB or giga-NodeB (either of which may be referred to as a gNB), and the like). The PC5 interface may also be a one-to-many communication interface (i.e., may be specified for group communications).

In some examples, the UE 115-a and the UE 115-b may perform a connection procedure (e.g. a sidelink connection procedure) to establish the sidelink connection 205. For example, the UE 115-a and the UE 115-b may perform a sidelink connection setup procedure to establish the sidelink connection 205. As part of the sidelink connection procedure, the UE 115-a may determine a DTX configuration 210 for the sidelink connection 205, and the DTX configuration 210 may be exclusively (e.g., specific) for the sidelink connection 205. In some other examples, the UE 115-a may determine the DTX configuration 210 prior to the sidelink connection procedure. The DTX configuration 210 may indicate a pattern of one or more DTX cycles, which may include a timing offset (e.g., a slot offset, a frame offset), a periodicity of the one or more DTX cycles, active DTX durations, or inactive DTX durations, or any combination thereof.

In some example, the UE 115-a may determine one or more of the timing offset (e.g., a slot offset, a frame offset), the periodicity of the one or more DTX cycles, the active DTX durations, or the inactive DTX durations, or any combination thereof, based in part on expected data traffic (e.g., a traffic load) on the sidelink connection 205. For example, the UE 115-a may determine one or more of the timing offset (e.g., a slot offset, a frame offset), the periodicity of the one or more DTX cycles, the active DTX durations, or the inactive DTX durations, or any combination thereof, based in part on a DRB configuration including a mapping and quasi-co-location indicator (PQI). The UE 115-a may provide the DTX configuration 210 to the UE 115-b as part of the sidelink connection procedure. In some examples, the sidelink connection setup procedure may be an RRC sidelink connection setup procedure, and the UE 115-a may provide the DTX configuration 210 in an RRC configuration message.

The UE 115-b may receive, the DTX configuration 210, from the UE 115-a as part of the sidelink connection procedure. In some examples, the UE 115-b may determine a DRX configuration 215 for the sidelink connection 205 based in part on the DTX configuration 210. The DRX configuration 215 may be exclusively for the sidelink connection 205. In some examples, the DRX configuration 215 may indicate a pattern of one or more DRX cycles, which may include a timing offset (e.g., a slot offset, a frame offset), a periodicity of the one or more DRX cycles, active DRX durations, or inactive DRX durations, or any combination thereof. As such, the UE 115-b (e.g., a receiver UE) may derive one or more DRX cycles based on the DTX configuration 210 from the UE 115-a (e.g., a transmitter UE). The UE 115-b may provide the DRX configuration 215 to the UE 115-a as part of the sidelink connection procedure. In some examples, the sidelink connection setup procedure may be an RRC sidelink connection setup procedure, and the UE 115-b may provide the DRX configuration 215 in an RRC configuration message.

The DTX configuration 210 and the DRX configuration 215 therefore are separate. Additionally, the DTX configuration 210 and the DRX configuration 215 are specific for a given sidelink connection, such as the sidelink connection 205. That is, UEs participating in multiple sidelink connections with multiple UEs (also referred to as peer UEs) may have separate DTX and DRX configurations (e.g., a separate DTX configuration and a separate DRX configuration) specific for each sidelink connection of the multiple sidelink connections it has with each UE of the multiple UEs.

By supporting one or more of the DTX configuration 210 or the DRX configuration 215, or both, for sidelink communications associated with the sidelink connection 205 the UE 115-a and the UE 115-b may experience power savings, among other benefits. In the example of FIG. 2, the sidelink connection procedure may be a unicast RRC sidelink connection setup procedure. As such, exchange of the DTX configuration 210 and the DRX configuration 215 may be performed via unicast communications. Examples of exchange of the DTX configuration 210 and the DRX configuration 215 via other communications, for example, such as groupcast communications and broadcast communications is described with reference to FIGS. 3 and 4.

Figure 3:
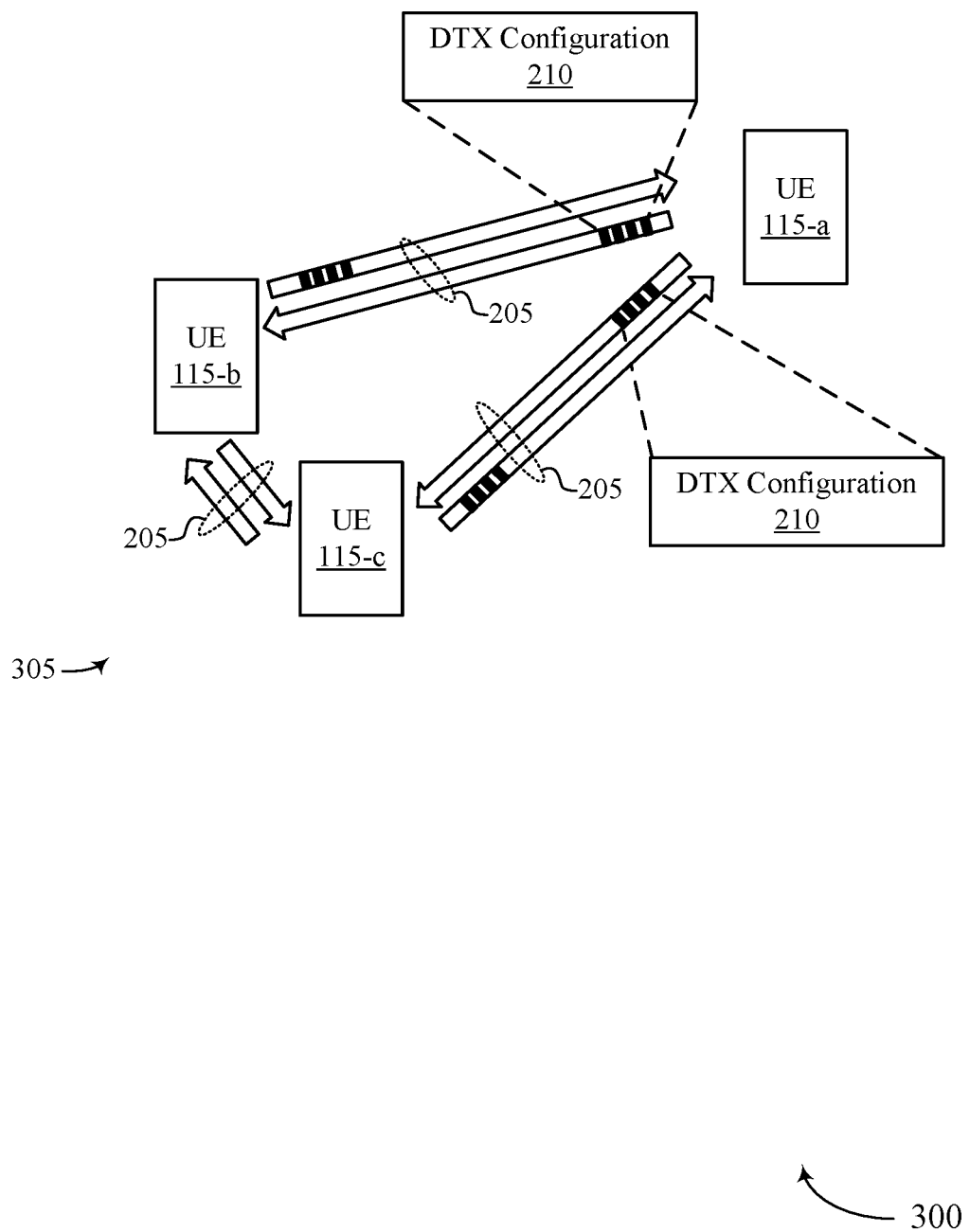

FIG. 3 illustrates an example of a wireless communications system 300 in accordance with one or more aspects of the present disclosure. In some examples, the wireless communications system 300 may implement aspects of the wireless communications systems 100 and 200. For example, the wireless communications system 300 may support multiple radio access technologies including 4G systems such as LTE systems, LTE-A systems, or LTE-A Pro systems, and 5G systems which may be referred to as NR systems. The wireless communications system 300 may also support sidelink communications between multiple UEs 115, such as between a UE 115-a, a UE 115-b, and a UE 115-c, which may be examples of corresponding devices described with reference to FIGS. 1 and 2. Examples of sidelink communications may include D2D communications, V2X communications systems, V2V communications systems, and the like. The wireless communications system 300 may also support decreased power consumption and, in some examples, may promote higher reliability and lower latency sidelink communications, among other benefits.

In the example of FIG. 3, the UE 115-a, the UE 115-b, and the UE 115-c may support groupcast communications for sidelink connections 205, which may be sidelink communications channels. For example, the sidelink communication channels may correspond to a PC5 interface between the UE 115-a and the UE 115-b, or the UE 115-a and the UE 115-c. The PC5 interface may facilitate direct communications between at least two UEs without involving a network infrastructure (e.g., a base station (e.g., an eNB, a next-generation NodeB or giga-NodeB (either of which may be referred to as a gNB), and the like). The PC5 interface may also be a one-to-many communication interface (i.e., may be specified for group communications). For example, the UE 115-a, the UE 115-b, and the UE 115-c may be part of a group 305.

The UE 115-a may transmit via groupcast communications the DTX configuration 210 to the group 305 using the sidelink connections 205. Similarly, one or more of the UE 115-a, the UE 115-b, and the UE 115-c may transmit via groupcast communications a corresponding DRX configuration to the group 305 using the sidelink connections 205. In the example of FIG. 3, DTX configuration 210 may be common for the group 305 (e.g., the UE 115-b and the UE 115-c). In other words, the DTX configuration 210 may be the same for the group 305 (e.g., the UE 115-b and the UE 115-c), while each of the UEs (e.g., the UE 115-b and the UE 115-c) may, in some examples, have different unicast traffic on a corresponding sidelink connection 205. Additionally, a DRX configuration may still be specific for a given sidelink connection, such as each sidelink connection 205. In other words, UEs participating in multiple sidelink connections with multiple UEs (also referred to as peer UEs) may have separate DRX configurations (e.g., a separate DRX configuration) specific for each sidelink connection of the multiple sidelink connections it has with each UE of the multiple UEs, even if the DTX configuration 210 is common for all UEs in the group 305.

Figure 4:
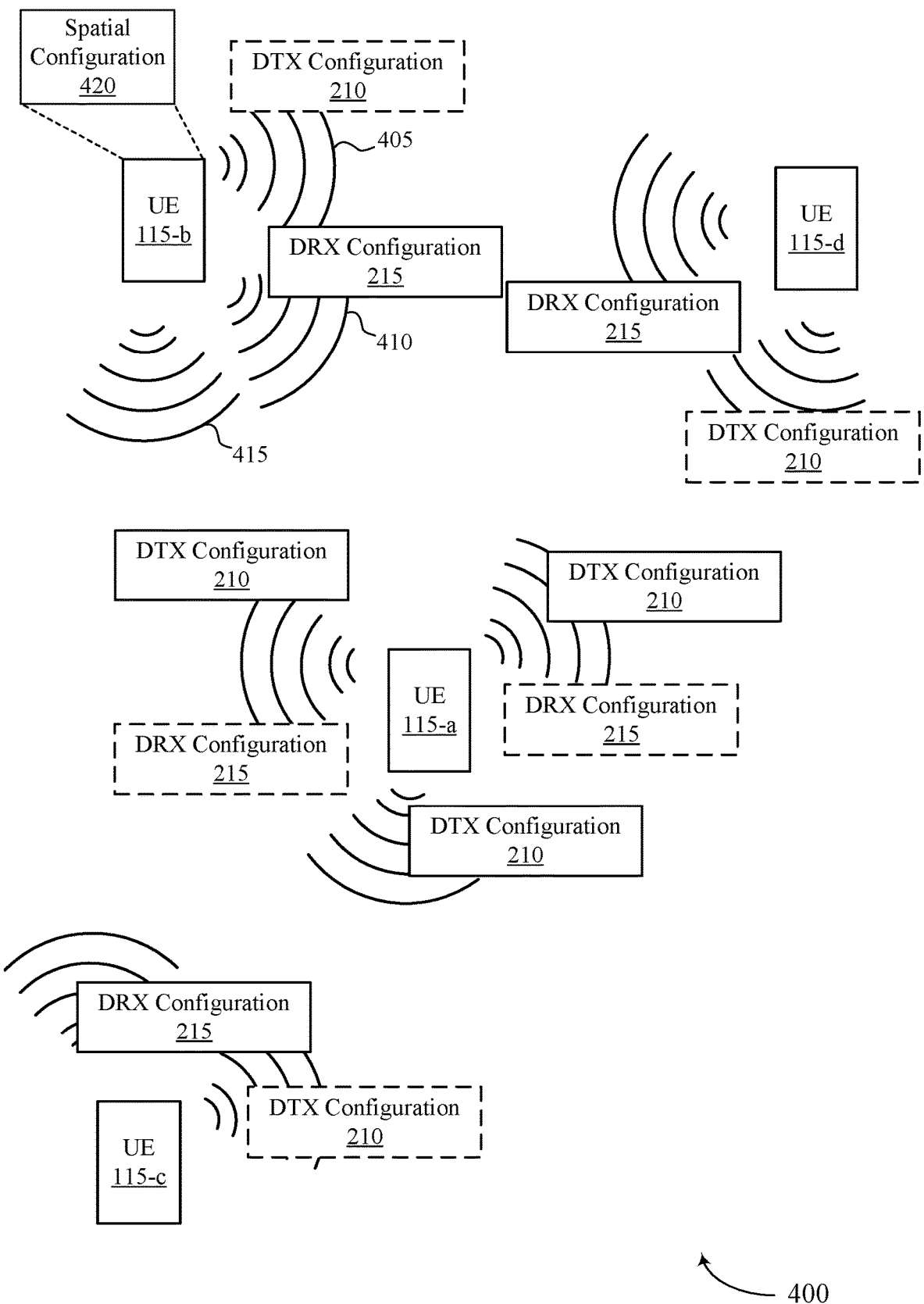

FIG. 4 illustrates an example of a wireless communications system 400 in accordance with one or more aspects of the present disclosure. In some examples, the wireless communications system 400 may implement aspects of the wireless communications systems 100 through 300. For example, the wireless communications system 400 may support multiple radio access technologies including 4G systems such as LTE systems, LTE-A systems, or LTE-A Pro systems, and 5G systems which may be referred to as NR systems. The wireless communications system 400 may also support sidelink communications between multiple UEs 115, such as a UE 115-a, a UE 115-b, a UE 115-c and a UE 115-d, which may be examples of corresponding devices described with reference to FIGS. 1 through 3. Examples of sidelink communications may include D2D communications, V2X communications systems, V2V communications systems, and the like. The wireless communications system 400 may also support decreased power consumption and, in some examples, may promote higher reliability and lower latency sidelink communications, among other benefits.

In the example of FIG. 4, the UE 115-a, the UE 115-b, the UE 115-c and the UE 115-d may support broadcast communications for sidelink connections, which may be sidelink communications channels. For example, the sidelink communication channels may correspond to a PC5 interface between the UE 115-a, the UE 115-b, the UE 115-c and the UE 115-d. The PC5 interface may facilitate direct communications between at least two UEs without involving a network infrastructure (e.g., a base station (e.g., an eNB, a next-generation NodeB or giga-NodeB (either of which may be referred to as a gNB), and the like). The PC5 interface may also be a one-to-many communication interface (i.e., may be specified for group communications).

The UE 115-a may broadcast the DTX configuration 210 to the UE 115-b, the UE 115-c and the UE 115-d. Similarly, one or more of the UE 115-b, the UE 115-c and the UE 115-d may broadcast a corresponding DRX configuration 215. In the example of FIG. 4, DTX configuration 210 may be common for all the UEs 115 (e.g., the UE 115-b, the UE 115-c, and the UE 115-d). That is, the DTX configuration 210 may be the same for all the UEs 115 (e.g., the UE 115-b, the UE 115-c, and the UE 115-d), while each of the UEs 115 (e.g., the UE 115-b, the UE 115-c, and the UE 115-d) may, in some examples, have different unicast traffic on a corresponding sidelink connection 205. Additionally, a DRX configuration 215 may still be specific for a given sidelink connection, such as each sidelink connection. In other words, UEs 115 participating in multiple sidelink connections with multiple UEs 115 (also referred to as peer UEs) may have separate DRX configurations 215 (e.g., a separate DRX configuration 215) specific for each sidelink connection of the multiple sidelink connections it has with each UE 115 of the multiple UEs 115, even if the DTX configuration 210 is common for all the UEs 115.

Therefore, the UE 115-a, the UE 115-b, the UE 115-c and the UE 115-d may be part of multiple sidelink connections. As such, DTX configurations 210 and DRX configurations 215 may thereby by sidelink-specific. That is, DRX configurations 215 may be exclusive for each sidelink connection (e.g., sidelink). In some examples, as described herein, determination for a DTX configuration 210 or a DRX configuration 215 may be based in part on multiple active sidelink connections (e.g., active sidelinks). Each of UEs 115 may, based in part on determining a corresponding DRX configuration 215, provide the DRX configuration 215 to all its peer UEs, each of the UEs 115 may also receive DRX configurations 215 from all its peer UEs.

Returning to FIG. 2, in some examples, the UE 115-b may receive multiple DTX configurations 210 from multiple UEs 115, including the UE 115-a. For example, with reference to FIGS. 3 and 4, the UE 115-b may receive DTX configurations 210 from the UE 115-a, the UE 115-c, or the UE 115-c, or a combination thereof. The UE 115-b may receive the multiple DTX configurations 210 (e.g., a set of DTX configurations 210) via unicast communications, groupcast communications, or broadcast communications, as described with reference to FIGS. 2 through 4. The UE 115-b may thus receive DTX configurations 210 over multiple (e.g., all) active sidelink connections.

The UE 115-*b* (e.g., a receiver UE) may determine the DRX configuration 215 (e.g., a pattern of one or more DRX cycles) based on the received set of DTX configurations 210. In other words, the UE 115-*b* may determine the DRX configuration 215 based on the received multiple DTX configurations 210 over multiple sidelink connections. In some examples, when the UE 115-*b* receives (e.g., a receiver UE) multiple DTX configurations 210 from multiple UEs 115 (e.g., the UE 115-*a*, the UE 115-*c*, or the UE 115-*c*, or a combination thereof), the UE 115-*b* may determine the DRX configuration 215 based in part on a union operation (also referred to as simply a union) on the received multiple DTX configurations 210. For example, the UE 115-*b* may identify all DTX cycles associated with the received multiple DTX configurations 210, and determine the DRX configuration 215 based in part on all the identified DTX cycles associated with the received multiple DTX configurations 210. In some examples, the UE 115-*b* may identify DTX cycles associated with the received multiple DTX configurations 210, and determine DTX cycles that are common to the received multiple DTX configurations 210. Based on the determined common DTX cycles, the UE 115-*b* may determine the DRX configuration 215.

The UE 115-*b* may, in some examples, determine or generate the DRX configuration 215 based in part on performing a union operation (e.g., a union) of a subset of DTX configurations 210 associated with the received set of DTX configurations 210. In some examples, the UE 115-*b* may determine a receiver spatial configuration 420 (Rx spatial configuration). The UE 115-*b* may select the subset of DTX configurations 210 associated with the received set of DTX configurations 210 based in part on the receiver spatial configuration 420. The subset of DTX configurations 210 may thus correspond to sidelink connections associated with a same receive directional beam of the UE 115-*b*. That is, the subset of DTX configurations 210 include all sidelink connections that can be received using a same receiver directional beam as intended to be used for a corresponding sidelink connection between the UE 115-*b* and a peer UE (e.g., the UE 115-*a*, the UE 115-*c*, or the UE 115-*d*, or any combination thereof).

By way of example, with reference to FIG. 4, the UE 115-*b* may determine a DRX configuration 215 for a sidelink connection between the UE 115-*b* and the UE 115-*d*. The sidelink connection between the UE 115-*b* and the UE 115-*d* may correspond to a first receive directional beam 405 to receive the DTX configuration 210 from the UE 115-*d*, or other various communication content (e.g., data). Additionally, for a different sidelink connection between the UE 115-*b* and the UE 115-*a*, the UE 115-*b* may use a second receive directional beam 410 to receive the DTX configuration 210 from the UE 115-*a*, or other various communication content (e.g., data). Similarly, for another sidelink connection between the UE 115-*b* and the UE 115-*c*, the UE 115-*b* may use a third receive directional beam 415 to receive the DTX configuration 210 from the UE 115-*c*, or other various communication content (e.g., data). The UE 115-*b* may still be able to receive from the UE 115-*d* using the second receive directional beam 410 to receive the DTX configuration 210 from the UE 115-*d*, or other various communication content (e.g., data), but not if it uses the third receive directional beam 415 (e.g., quality may be less than a minimum QoS). Thus, the UE 115-*b* may determine the DRX configuration 215 for the sidelink connection between the UE 115-*b* and the UE 115-*d* based in part on a union of the DTX configuration 210 from the UE 115-*b* the UE 115-*d*, but not of the DTX configuration from the UE 115-*c*.

The determined DRX configuration 215 by the UE 115-*b* may be based in part on one or more DRX cycles (e.g., a set of DRX patterns) with different criterions. In some examples, the determined DRX configuration 215 by the UE 115-*b* may be based in part on a different peak QoS metric associated with a corresponding DTX configuration 210 of the one or multiple received DTX configurations 210. In some other examples, the determined DRX configuration 215 by the UE 115-*b* may be based in part on a different traffic throughput associated with a corresponding DTX configuration 210 of the one or multiple received DTX configurations 210. In other examples, the determined DRX configuration 215 by the UE 115-*b* may be based in part on a different spectral efficiency associated with a corresponding DTX configuration 210 of the one or multiple received DTX configurations 210. In some examples, the determined DRX configuration 215 by the UE 115-*b* may be based in part on a different RSRP associated with a corresponding DTX configuration 210 of the one or multiple received DTX configurations 210. In other examples, the determined DRX configuration 215 by the UE 115-*b* may be based in part on a different RSRQ associated with a corresponding DTX configuration 210 of the one or multiple received DTX configurations 210. The determined DRX configuration 215 by the UE 115-*b* may therefore be based in part on one or more DRX cycles (e.g., a set of DRX patterns) with different criterions, for example, such as different peak-QoS, throughput, spectral efficiency, RSRP, or RSRQ, or any combination thereof.

The UE 115-*b* (e.g., a receiver UE) may transmit, to a peer UE 115 (e.g., the UE 115-*a*, the UE 115-*c*, or the UE 115-*d*, or any combination thereof), a request message (e.g., an offset align request message) including a request to adjust a parameter of a DTX configuration 210 associated with the peer UE 115. The parameter may be a DTX period, a DTX active duration, a DTX timing offset, or any combination thereof. For example, the UE 115-*b* may request the peer UE 115 (e.g., the UE 115-*a*, the UE 115-*c*, or the UE 115-*d*, or any combination thereof) to change a DTX timing offset to reduce a DRX active duration associated with the UE 115-*b*, thereby providing increased power saving for the UE 115-*b*. The peer UE 115 (e.g., the UE 115-*a*, the UE 115-*c*, or the UE 115-*d*, or any combination thereof) may transmit, and the UE 115-*b* may receive, a response message (e.g., an offset align response message) related to the request to adjust the parameter of the DTX configuration 210 associated with the peer UE 115. The response message may indicate one or more of an adjusted DTX period, an adjusted DTX active duration, or an adjusted DTX timing offset, or any combination thereof.

In the example above, the response message may indicate a new DTX timing offset. In some other examples, the response message may indicate a cause for rejecting the request to adjust the parameter associated with the DTX configuration 210. For example, the peer UE 115 (e.g., the UE 115-*a*, the UE 115-*c*, or the UE 115-*d*, or any combination thereof) may indicate that it cannot change the DTX timing offset because of time sensitive data. As a result, the UE 115-*b* may transmit request message including a request to adjust a parameter of a DTX configuration 210 associated with another peer UE 115 that the UE 115-*b* has an active sidelink connection with. For example, the UE 115-*b* may request the peer UE 115 (e.g., the UE 115-*a*, the UE 115-*c*, or the UE 115-*d*, or any combination thereof) to change a DTX timing offset to reduce a DRX active duration associated with the UE 115-*b*, thereby providing increased power saving for the UE 115-*b*.

With reference to FIGS. 2 through 4, the UE 115-*a* (e.g., a transmitter UE) may transmit (e.g., signal) the DTX configuration 210 for all its active sidelink connections, including the sidelink connection 205 between the UE 115-*a* and the UE 115-*b* (as shown in FIG. 2). The UE 115-*a* may also transmit the DTX configuration 210 for sidelink connections (e.g., sidelinks) the UE 115-*a* is currently listening on (e.g., sidelinks between the UE 115-*a* and the UE 115-*c*, or between the UE 115-*a* and the UE 115-*d*). In some examples, the UE 115-*a* may transmit the DTX configuration 210 to peer UEs (e.g., the UE 115-*b*, the UE 115-*c*, or the UE 115-*d*, or any combination thereof) based in part on a device identifier (e.g., peer identifier). In some examples, each peer UE may align its DTX occasions based in part on the received DTX configuration 210. Similarly, the peer UE may determine its DTX configuration, and provide it to the UE 115-*a*. As such, UEs 115 may determine their DRX configurations 215 (e.g., DRX patterns) based in part on received DTX configurations 210 (e.g., DTX patterns). The UEs 115 may also request peer UEs to adjust one or more parameters of the DTX configurations (e.g., DTX timing offset adjustment). The UEs may also notify all peer UEs of adjusted DRX configurations 215.

For example, one or more UEs 115 (e.g., the UE 115-*a*, the UE 115-*b*, the UE 115-*c*, or the UE 115-*d*, or any combination thereof) may support DTX and DRX reconfiguration. That is, one or more of the UE 115-*a*, the UE 115-*b*, the UE 115-*c*, or the UE 115-*d*, or any combination thereof, may update a DTX pattern (e.g., DTX cycles) or a DRX pattern (e.g., DRX cycles), or both. In some example, one or more of the UE 115-*a*, the UE 115-*b*, the UE 115-*c*, or the UE 115-*d*, or any combination thereof, may determine to update a DTX pattern (e.g., DTX cycles) or a DRX pattern (e.g., DRX cycles), or both, based in part on a trigger. The trigger may be a new sidelink connection or a new sidelink application, or both. One or more of the UE 115-*a*, the UE 115-*b*, the UE 115-*c*, or the UE 115-*d*, or any combination thereof, may transmit an update message to a corresponding peer UE (e.g., one or more of the UE 115-*a*, the UE 115-*b*, the UE 115-*c*, or the UE 115-*d*, or any combination thereof) indicating the updated DTX pattern (e.g., DTX cycles) or the updated DRX pattern (e.g., DRX cycles), or both. In some examples, the update message may be transmitted based in part on the peer UE's DRX configuration (e.g., DRX cycle). In some examples, this may trigger an offset adjustment request as in the link establishment case described herein.

One or more UEs 115 (e.g., the UE 115-*a*, the UE 115-*b*, the UE 115-*c*, or the UE 115-*d*, or any combination thereof) may support activity-based DRX mode reconfiguration (e.g., DTX and/or DRX reconfiguration). For example, the UE 115-*b* may identify capability information (e.g., a UE capability), and may transmit a message including the capability information to the UE 115-*a*. In some examples, the UE 115-*b* may provide the capability information in an RRC connection message as part of a connection procedure, such as an RRC connection procedure. The UE 115-*b* may be configured to enable DRX reconfiguration mode based on the capability information. In some examples, the UE 115-*b* may provide a DTX configuration or a DRX configuration, or both, in the capability information. In some examples, the UE 115-*b* may monitor one or more DRX cycles based in part on the DRX configuration 215, and may activate a DRX timer based in part on the monitoring. In some examples, the UE 115-*b* may determine an absence of data from a peer UE (e.g., the UE 115-*a*) during the one or more DRX cycles based on the monitoring, and thereby may activate the DRX timer. In other words, the UE 115-*b* may start a timer if the UE 115-*b* does not receive data on a DRX occasion (e.g., DRX cycle) corresponding to a peer UE or a set of peer UEs.

The UE 115-*b* may adjust a pattern of one or more DRX cycles associated with the DRX configuration 215 based in part on the DRX timer lapsing. For example, the UE 115-*b* may modify a length of the one or more DRX cycles. The UE 115-*b* may transmit an indication of the modified length of the one or more DRX cycles to a peer UE or a set of peer UEs. In other words, if no data is received from the peer UE or set of peer UEs before the timer expires, the UE 115-*b* may modify a DRX occasion (e.g., DRX cycles). In some examples, modifying the DRX occasion may include increasing or decreasing a length (e.g., a duration) of a DRX period associated with the peer UE or the set of peer UEs. The UE 115-*b* may notify the peer UE or the set of peer UEs of the modified DRX period in a new DRX configuration.

Therefore, with reference to FIGS. 2 through 4, for sidelink communications, the UEs 115 may experience power savings as a result of providing a DTX configuration or a DRX configuration, or both. Particular aspects of the subject matter described with reference to FIGS. 2 through 4 may be implemented to realize one or more of the following potential power savings and increased efficiency with regards to sidelink communications, among others. The techniques employed by the UEs 115 may provide power savings and increased user experience to the operation of the UEs 115. For example, operations performed by the UEs 115 may provide higher reliability and lower latency sidelink operations to sidelink communications. In some examples, configuring the UEs 115 to support DTX configurations or DRX configurations, or both, for sidelink communications may support decreased power consumption, increased spectral efficiency, and, in some examples, may promote increased efficiency for sidelink operations, among other benefits.

Figure 5:
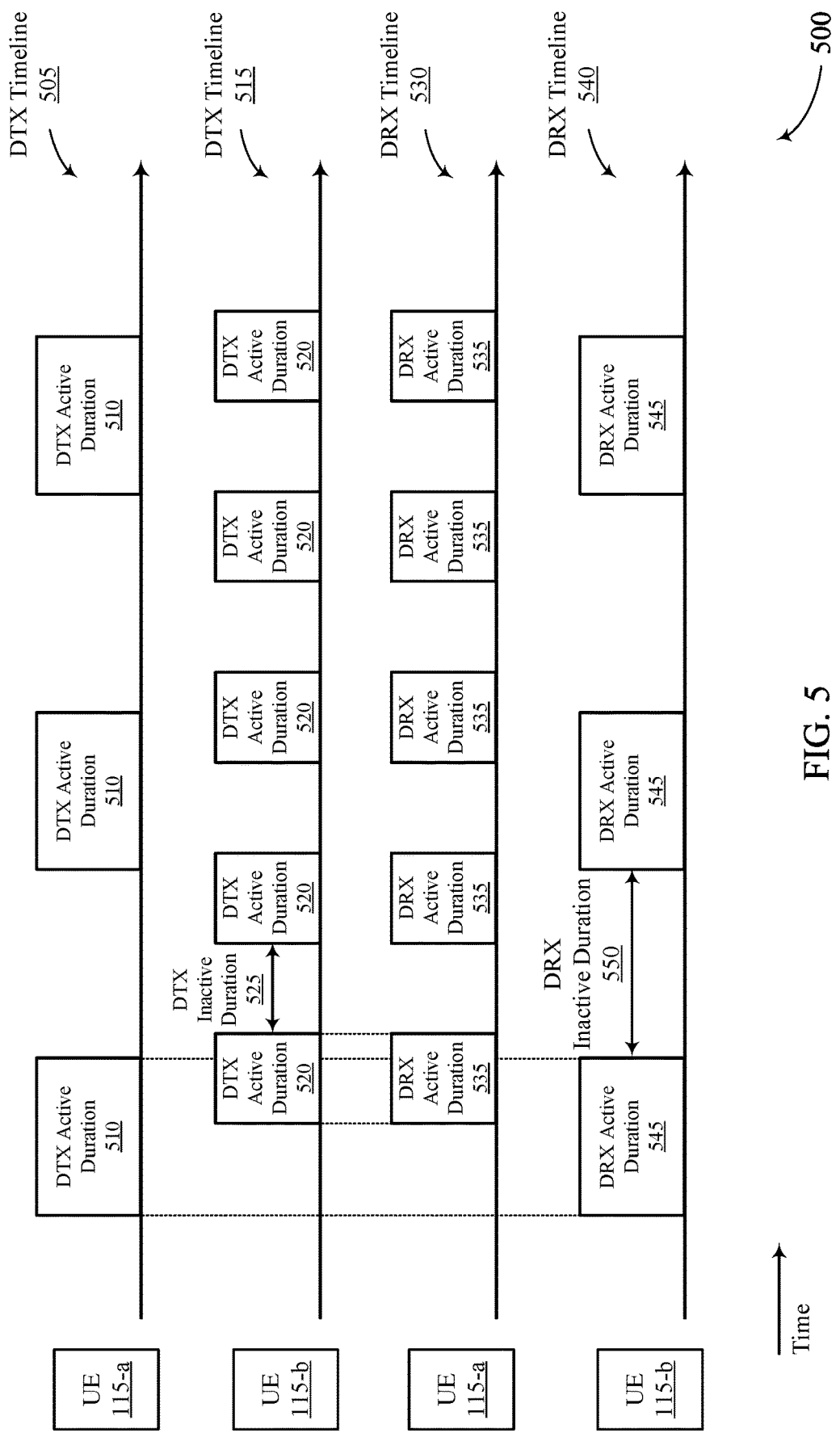
FIGS. 5 through 6 illustrate example of transmission timelines in accordance with one or more aspects of the present disclosure.

FIG. 5 illustrates an example of a transmission timeline 500 in accordance with one or more aspects of the present disclosure. In some examples, transmission timeline 500 may implement aspects of the wireless communication system 100 through 400 described with reference to FIGS. 1 through 4, respectively. For example, the transmission timeline 500 may be based on a configuration by a UE 115, and implemented by the UE 115. The transmission timeline 500 may be applicable to implementations or instances when the UE 115 is configured with sidelink communication, such as sidelink communications in V2X and V2V communication systems. In some examples, the transmission timeline 500 may be applicable to implementations or instances when the UE 115 is configured with DRX configuration for sidelink communications, such as sidelink communications in V2X and V2V communication systems.

In the example illustrated in FIG. 5, the transmission timeline 500 may include sidelink communications between a UE 115-*a* and a UE 115-*b*, which may be examples of corresponding devices described with reference to FIGS. 1 through 4. The sidelink communications between the UE 115-*a* and the UE 115-*b* may be an example of unicast communications including a single sidelink connection for both UEs 115 (e.g., the UE 115-*a* and the UE 115-*b*). The UE 115-*a* or the UE 115-*b*, or both, may carry sidelink communications (e.g., in an FDD mode) or may be configured to carry sidelink communications (e.g., in a TDD mode). The transmission timeline 500 may include a DTX timeline 505 associated with the UE 115-*a*. The DTX timeline 505 may include one or more DTX active durations 510 (also referred to as DTX ON durations). The DTX active durations 510 may correspond to time resources (for example, a symbol, a minislot, a slot, a subframe, a frame), as well as frequency resources (for example, subcarriers, carriers). The transmission timeline 500 may include a DTX timeline 515 associated with the UE 115-b. The DTX timeline 515 may include one or more DTX active durations 520, as well as one or more DTX inactive durations 525 (where the UE 115-b is operating in a low power mode). The DTX active durations 520, as well as the DTX inactive durations 525, may correspond to time resources (for example, a symbol, a minislot, a slot, a subframe, a frame), as well as frequency resources (for example, subcarriers, carriers).

The transmission timeline 500 may include a DRX timeline 530 associated with the UE 115-a. The DRX timeline 530 may include one or more DRX active durations 535 (also referred to as DRX ON durations). The DRX active durations 535 may correspond to time resources (for example, a symbol, a minislot, a slot, a subframe, a frame), as well as frequency resources (for example, subcarriers, carriers). The transmission timeline 500 may include a DRX timeline 540 associated with the UE 115-b. The DRX timeline 540 may include one or more DRX active durations 545, as well as one or more DRX inactive durations 550 (where the UE 115-b is operating in a low power mode). The DRX active durations 545, as well as the DRX inactive durations 550, may correspond to time resources (for example, a symbol, a minislot, a slot, a subframe, a frame), as well as frequency resources (for example, subcarriers, carriers).

In some examples, the UE 115-a and the UE 115-b may transmit or receive various communication content (e.g., control information, data) in an asymmetric manner. In other words, traffic associated the UE 115-a and the UE 115-b may be asymmetric in context of the DTX timelines 505, 515 or DRX timelines 530, 540, or both. For example, the UE 115-a may generate and transmit information (e.g., packets) every 320 ms, while the UE 115-b may generate and transmit information (e.g., packets) every 64 ms. In some examples, the UE 115-a or the UE 115-b, or both, may be configured to employ operating modes that reduce power consumption, such as half-duplex communications (e.g., a mode that supports one-way communication via transmission or reception, but not transmission and reception simultaneously). For example, the UE 115-a or the UE 115-b, or both, may be configured (e.g., scheduled) with a time-division duplexing (TDD) configuration. In some examples, the UE 115-a or the UE 115-b, or both, may be configured (e.g., scheduled) with a TDD configuration to manage half-duplex communications between the UE 115-a and the UE 115-b. Sidelink communications between the UE 115-a and the UE 115-b may thus be divided in a time-domain. In other words, at one moment in time either the UE 115-a or the UE 115-b may transmit, or receive, information (e.g., packets) over a connection (e.g., sidelink) between the UE 115-a and the UE 115-b.

The UE 115-a or the UE 115-b, or both may determine a DRX configuration associated with the DRX timeline 530, 540 based in part on a DTX configuration. For example, a DTX configuration associated with the UE 115-a and for the connection between the UE 115-a and the UE 115-b may drive a DRX configuration at a peer UE (e.g., the UE 115-b). Similarly, a DTX configuration associated with the UE 115-b and for the connection between the UE 115-a and the UE 115-b may drive a DRX configuration at a peer UE (e.g., the UE 115-a). By way of example, and as described with reference to FIGS. 2 through 4, the UE 115-a and the UE 115-b may perform a connection procedure (e.g., an RRC connection setup procedure) to establish or refine a connection (e.g., sidelink connection) between the UE 115-a and the UE 115-b. During the connection procedure, the UE 115-a may provide a DTX configuration that may indicate a DTX pattern (e.g., DTX cycles) of 320 ms. Additionally or alternatively, the DTX configuration may indicate one or more of a DTX timing offset, DTX active durations, or DTX inactive durations, or any combination thereof. Similarly, during the connection procedure, the UE 115-b may provide a DTX configuration that may indicate a DTX pattern (e.g., DTX cycles) of 64 ms. Additionally or alternatively, the DTX configuration may indicate one or more of a DTX timing offset, DTX active durations, or DTX inactive durations, or any combination thereof.

Based on the exchange of the DTX configurations, the UE 115-a and the UE 115-b may negotiate (e.g., determine) the DTX timing offset. In the example of FIG. 5, DRX configuration determination may be based on the DTX configurations of the peer UE (e.g., the UE 115-a or the UE 115-b). That is, a DRX configuration of the UE 115-a may be based on the DTX configuration of the UE 115-b (e.g., DRX configuration for the UE 115-a=DTX configuration of the UE 115-b). Similarly, a DRX configuration of the UE 115-b may be based on the DTX configuration of the UE 115-a (e.g., DRX configuration for the UE 115-b=DTX configuration of the UE 115-a). Therefore, DTX configuration for a connection (e.g., sidelink) drive DRX configuration at a peer UE.

Figure 6:
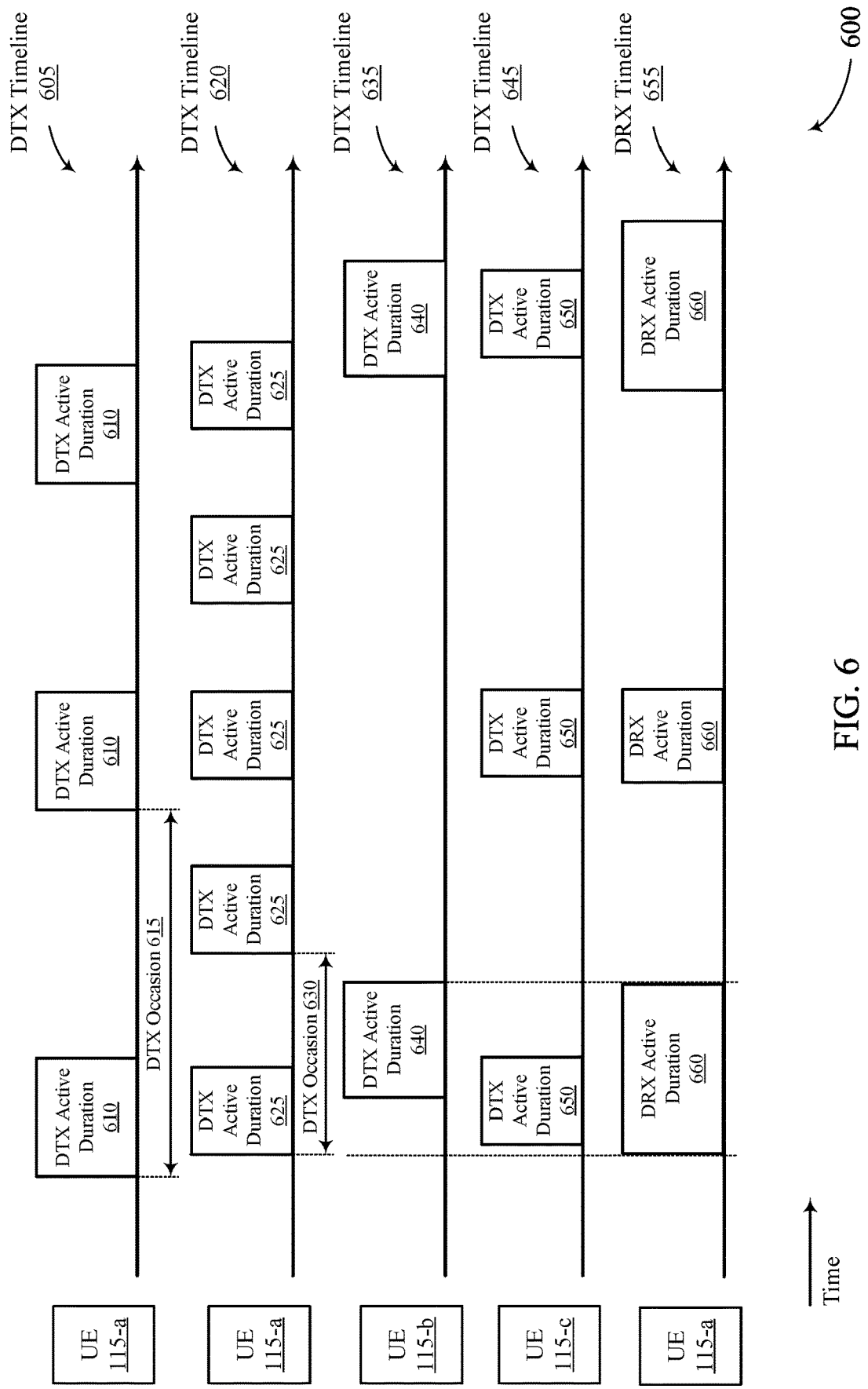

FIG. 6 illustrates an example of a transmission timeline 600 in accordance with one or more aspects of the present disclosure. In some examples, transmission timeline 600 may implement aspects of the wireless communication system 100 through 400 described with reference to FIGS. 1 through 4, respectively. For example, the transmission timeline 600 may be based on a configuration by a UE 115, and implemented by the UE 115. The transmission timeline 600 may be applicable to implementations or instances when the UE 115 is configured with sidelink communication, such as sidelink communications in V2X and V2V communication systems. In some examples, the transmission timeline 600 may be applicable to implementations or instances when the UE 115 is configured with DRX configuration for sidelink communications, such as sidelink communications in V2X and V2V communication systems.

In the example illustrated in FIG. 6, the transmission timeline 600 may include sidelink communications between a UE 115-a and a UE 115-b, which may be examples of corresponding devices described with reference to FIGS. 1 through 4. Additionally, the transmission timeline 600 may include sidelink communications between the UE 115-a and a UE 115-c, which may be examples of corresponding devices described with reference to FIGS. 1 through 4. The sidelink communications between the UE 115-a and the UE 115-b may be an example of unicast communications. That is, sidelink connection may be a unicast connection between the UE 115-a and the UE 115-b. Similarly, the sidelink communications between the UE 115-a and the UE 115-c may be an example of unicast communications, and may be another unicast connection between the UE 115-a and the UE 115-c. Thus, the UE 115-a may communicate with multiple UEs (e.g., the UE 115-b and the UE 115-c) over multiple unicast connections (e.g., unicast links). One or more of the UE 115-a, the UE 115-b, and the UE 115-c may carry sidelink communications (e.g., in an FDD mode) or may be configured to carry sidelink communications (e.g., in a TDD mode).

The transmission timeline 600 may include a DTX timeline 605 associated with the UE 115-a. The DTX timeline 605 may correspond to a sidelink connection (e.g., a unicast connection) between the UE 115-*a* and the UE 115-*b*. The DTX timeline 605 may include one or more DTX active durations 610 (also referred to as DTX ON durations), which may be part of a DTX occasion 615 (also referred to as a DTX cycle). The DTX active durations 610 may correspond to time resources (for example, a symbol, a minislot, a slot, a subframe, a frame), as well as frequency resources (for example, subcarriers, carriers). The transmission timeline 600 may include a DTX timeline 620 associated with the UE 115-*a*. The DTX timeline 620 may correspond to a sidelink connection (e.g., a unicast connection) between the UE 115-*a* and the UE 115-*c*. The DTX timeline 620 may include one or more DTX active durations 625, which may be part of a DTX occasion 630 (also referred to as a DTX cycle). The DTX active durations 625 may correspond to time resources (for example, a symbol, a minislot, a slot, a subframe, a frame), as well as frequency resources (for example, subcarriers, carriers).

The transmission timeline 600 may include a DTX timeline 635 associated with the UE 115-*b*. The DTX timeline 635 may correspond to a sidelink connection (e.g., a unicast connection) between the UE 115-*b* and the UE 115-*a*. The DTX timeline 635 may include one or more DTX active durations 640 (also referred to as DTX ON durations). The DTX active durations 640 may correspond to time resources (for example, a symbol, a minislot, a slot, a subframe, a frame), as well as frequency resources (for example, subcarriers, carriers). The transmission timeline 600 may include a DTX timeline 645 associated with the UE 115-*c*. The DTX timeline 645 may correspond to a sidelink connection (e.g., a unicast connection) between the UE 115-*c* and the UE 115-*a*. The DTX timeline 645 may include one or more DTX active durations 650. The DTX active durations 650 may correspond to time resources (for example, a symbol, a minislot, a slot, a subframe, a frame), as well as frequency resources (for example, subcarriers, carriers). The transmission timeline 600 may include a DRX timeline 655 associated with the UE 115-*a*. The DRX timeline 655 may correspond to a sidelink connection (e.g., a unicast connection) between the UE 115-*a* and the UE 115-*b*, or the UE 115-*a* and the UE 115-*c*, or both. The DRX timeline 655 may include one or more DRX active durations 660 (also referred to as DTX ON durations).

In some examples, the DRX timeline 655 may be based in part on the DTX timeline 635 and the DTX timeline 645. For example, as described herein, the UE 115-*a* may for example, determine the DRX timeline 655 (e.g., a DRX configuration) based in part on a union of a DTX configuration associated with the DTX timeline 635 (associated with the UE 115-*b*) and a DTX configuration associated with the DTX timeline 645 (associated with the UE 115-*c*). Similarly, as described herein, the UE 115-*b* may for example, determine a DRX timeline (e.g., a DRX configuration) based in part on a union of a DTX configuration associated with the DTX timeline 605 (associated with the UE 115-*a*) and a DTX configuration associated with the DTX timeline 645 (associated with the UE 115-*c*). Additionally, as described herein, the UE 115-*c* may for example, determine a DRX timeline (e.g., a DRX configuration) based in part on a union of a DTX configuration associated with the DTX timeline 605 (associated with the UE 115-*a*) and a DTX configuration associated with the DTX timeline 635 (associated with the UE 115-*b*).

By supporting multiple sidelink connections, the UE 115-*a* may transmit information (e.g., packets) to a peer UE, such as the UE 115-*b* or the UE 115-*c*, based on the DTX configuration of the peer UE. For example, the UE 115-*a* may generate and transmit information (e.g., packets) every 320 ms (with a 10 ms DTX active duration (e.g., ON duration)) to the UE 115-*b*. The UE 115-*c* may also generate and transmit information (e.g., packets) every 64 ms (with a 5 ms DTX active duration (e.g., ON duration)) to the UE 115-*c*. The UE 115-*a* may thus have a DTX configuration for each sidelink connection based on a traffic load it has for each particular sidelink connection. In some examples, the UE 115-*a* may have a cumulated DRX configuration (e.g., as illustrated by DRX timeline 655). Because the UE 115-*a* has multiple sidelink connections, the UE 115-*a* is waking up at different times to participate on those sidelinks (e.g., transmit or receive information). In some examples, knowledge of a peer's DRX enables the UE 115-*a* to reach to its peers beyond DTX indicated periods, for example, due to new traffic, burst traffic, radio resource management (RRM) related—event based traffic, etc. In the example of FIG. 6, DTX and DRX configurations for different sidelink connections may be different. The DRX configurations may also be derived based in part on accumulated DTX configurations over all active links (e.g., active sidelink connections.

Figure 7:
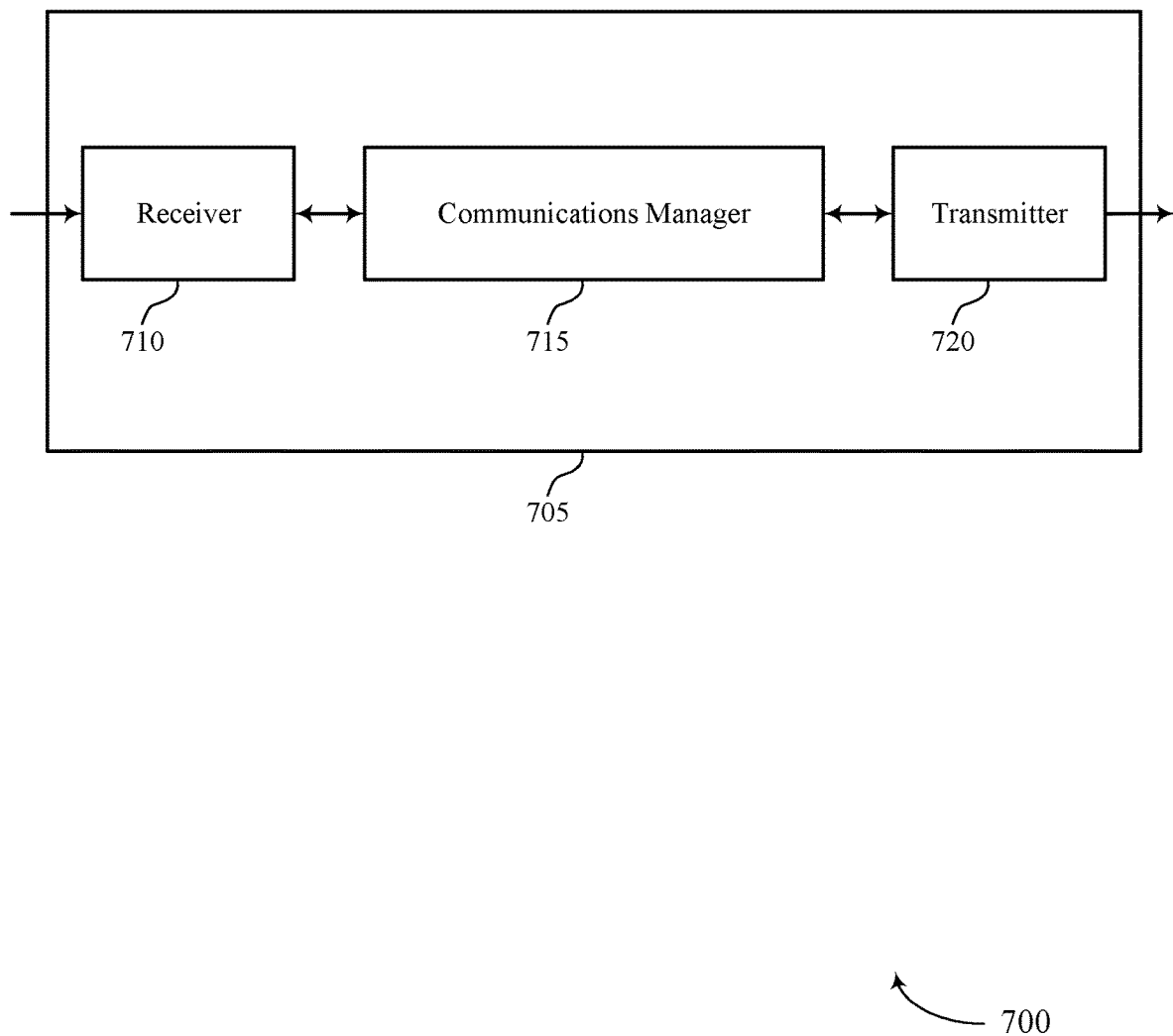
FIGS. 7 and 8 show block diagrams of devices in accordance with one or more aspects of the present disclosure.

FIG. 7 shows a block diagram 700 of a device 705 in accordance with one or more aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to DTX and DRX configurations for sidelink communications, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a second device, a DTX configuration for a sidelink connection between the device 705 and the second device, determine a DRX configuration based on the DTX configuration, and transmit, to the second device, the DRX configuration for the sidelink connection. The communications manager 715 may also determine a DTX configuration for a sidelink connection between the device 705 and a second device, transmit, to the second device, the DTX configuration, and receive, from the second device, a DRX configuration for the sidelink connection between the device 705 and the second device based on the DTX configuration. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver component. For example, the transmitter 720 may be an example of aspects of the transceiver 1020 described with reference to FIG. 10. The transmitter 720 may utilize a single antenna or a set of antennas.

Figure 8:
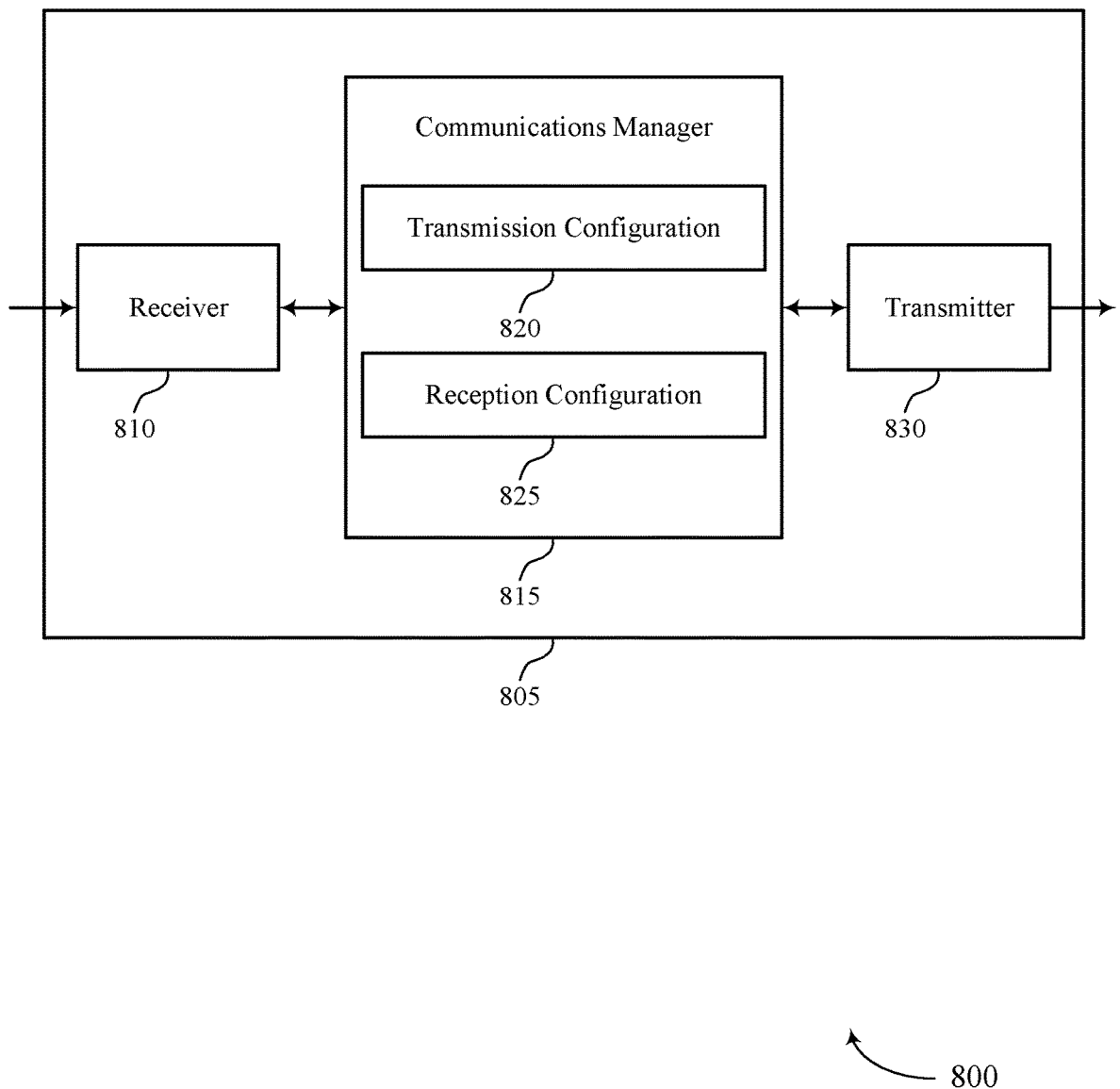

FIG. 8 shows a block diagram 800 of a device 805 in accordance with one or more aspects of the present disclosure. The device 805 may be an example of aspects of a device 705, or a UE 115 as described herein. The device 805 may include a receiver 810, a communications manager 815, and a transmitter 830. The device 805 may also include a processor. Each of these components may be in communication with one another (e.g., via one or more buses).

The receiver 810 may receive information such as packets, user data, or control information associated with various information channels (e.g., control channels, data channels, and information related to DTX and DRX configurations for sidelink communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a transmission configuration 820 and a reception configuration 825. The communications manager 815 may be an example of aspects of the communications manager 1010 described herein.

The transmission configuration 820 may receive, from a second device, a DTX configuration for a sidelink connection between the device 805 and the second device. The reception configuration 825 may determine a DRX configuration based on the DTX configuration and transmit, to the second device, the DRX configuration for the sidelink connection. The transmission configuration 820 may determine a DTX configuration for a sidelink connection between the device 805 and a second device. The reception configuration 825 may transmit, to the second device, the DTX configuration and receive, from the second device, a DRX configuration for the sidelink connection between the device 805 and the second device based on the DTX configuration.

The transmitter 830 may transmit signals generated by other components of the device 805. In some examples, the transmitter 830 may be collocated with a receiver 810 in a transceiver component. For example, the transmitter 830 may be an example of aspects of the transceiver 1020 described with reference to FIG. 10. The transmitter 830 may utilize a single antenna or a set of antennas.

Figure 9:
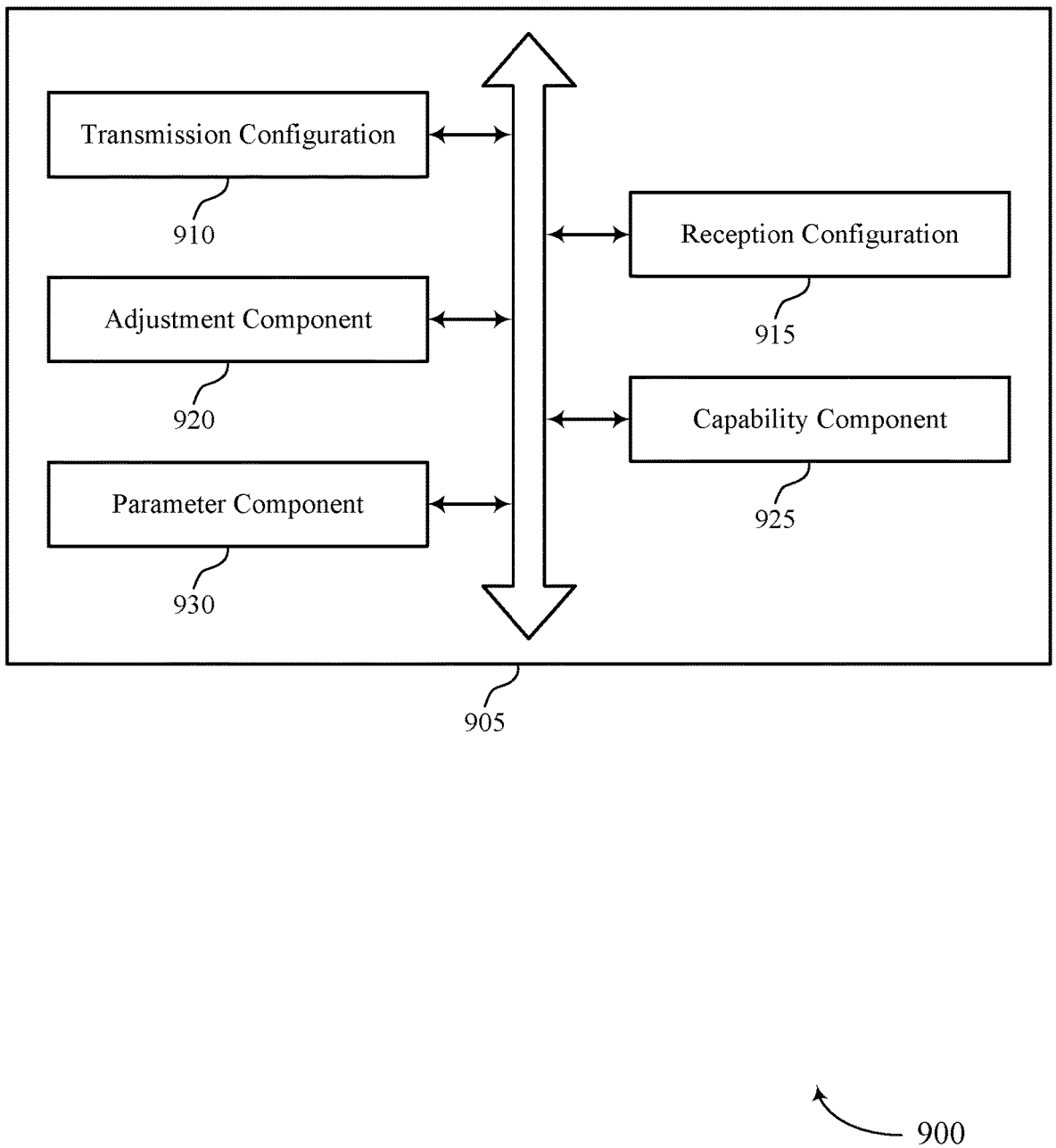
FIG. 9 shows a block diagram of a communications manager in accordance with one or more aspects of the present disclosure.

FIG. 9 shows a block diagram 900 of a communications manager 905 in accordance with one or more aspects of the present disclosure. The communications manager 905 may be an example of aspects of a communications manager 715, a communications manager 815, or a communications manager 1010 described herein. The communications manager 905 may include a transmission configuration 910, a reception configuration 915, an adjustment component 920, a capability component 925, and a parameter component 930. Each of these components may communicate, directly or indirectly, with one another (e.g., via one or more buses).

The transmission configuration 910 may receive, from a second device, a DTX configuration for a sidelink connection between the first device and the second device. In some examples, the transmission configuration 910 may determine a DTX configuration for a sidelink connection between the first device and a second device. In some examples, the transmission configuration 910 may receive, from a third device, a second DTX configuration for a second sidelink connection between the first device and the third device. In some examples, the transmission configuration 910 may determine a union of the DTX configuration, for the sidelink connection between the first device and the second device, and the second DTX configuration, for the second sidelink connection between the first device and the third device, where determining a DRX configuration is based on the union, the DRX configuration including a pattern of one or more DRX s cycles associated with the sidelink connection between the first device and the second device or the second sidelink connection between the first device and the third device, or both.

In some examples, the transmission configuration 910 may receive a set of DTX configurations from a set of devices, including the second device, for a set of sidelink connections, including the sidelink connection between the first device and the second device. In some examples, the transmission configuration 910 may determine a subset of sidelink connections of the set of sidelink connections corresponding to a same directional receive beam, the subset of sidelink connections including the sidelink connection between the first device and the second device, where determining the DRX configuration is based on a union of the DTX configuration, for the sidelink connection between the first device and the second device, and one or more other DTX configurations, for a corresponding sidelink connection of the subset of sidelink connections between the first device and a corresponding other device associated with the corresponding sidelink connection.

In some examples, the transmission configuration 910 may determine the subset of sidelink connections of the set of sidelink connections corresponding to the same directional receive beam is based on a receiver spatial configuration associated with the first device. In some examples, the transmission configuration 910 may transmit the DTX configuration and the DRX configuration to a set of devices, including the second device, for a set of sidelink connections, including the sidelink connection between the first device and the second device. In some examples, the transmission configuration 910 may transmit the DTX configuration and the DRX configuration to the set of devices, including the second device, for the set of sidelink connections, including the sidelink connection between the first device and the second device, based on a corresponding device identifier associated with each device of the set of devices.

In some examples, the transmission configuration 910 may receive the DTX configuration based on a sidelink connection procedure. In some examples, the transmission configuration 910 may receive the DTX configuration in an RRC configuration message during the unicast RRC sidelink connection setup procedure. In some examples, the transmission configuration 910 may receive the DTX configuration for the sidelink connection based on a broadcast connection associated with the second device. In some examples, the transmission configuration 910 may receive the DTX configuration for the sidelink connection based on a groupcast connection associated with the second device.

In some examples, the transmission configuration 910 may transmit the DTX configuration based on a sidelink connection procedure. In some examples, the transmission configuration 910 may transmit the DTX configuration in an RRC configuration message during the unicast RRC sidelink connection setup procedure. In some examples, the transmission configuration 910 may broadcast the DTX configuration to a set of devices, including the second device, based on a broadcast connection associated with the set of devices. In some examples, the transmission configuration 910 may transmit the DTX configuration to a set of devices, including the second device, based on a groupcast connection associated with the set of devices.

In some cases, the DTX configuration is exclusively for the sidelink connection. In some cases, the DRX configuration includes a pattern of one or more DRX s cycles, each DRX cycle of the pattern corresponding to a different peak QoS metric of a corresponding DTX configuration of the one or more other DTX configurations. In some cases, the DRX configuration includes a pattern of one or more DRX s cycles, each DRX cycle of the pattern corresponding to a different traffic throughput metric of a corresponding DTX configuration of the one or more other DTX configurations. In some cases, the DRX configuration includes a pattern of one or more DRX s cycles, each DRX cycle of the pattern corresponding to a different spectral efficiency metric of a corresponding DTX configuration of the one or more other DTX configurations. In some cases, the DRX configuration includes a pattern of one or more DRX s cycles, each DRX cycle of the pattern corresponding to a different RSRP metric of a corresponding DTX configuration of the one or more other DTX configurations. In some cases, the DRX configuration includes a pattern of one or more DRX s cycles, each DRX cycle of the pattern corresponding to a different RSRQ metric of a corresponding DTX configuration of the one or more other DTX configurations.

In some cases, the sidelink connection procedure includes a sidelink connection setup procedure. In some cases, the sidelink connection setup procedure includes a unicast RRC sidelink connection setup procedure. In some cases, the DTX configuration includes a pattern of one or more DTX cycles. In some cases, the DTX configuration including the pattern of the one or more DTX cycles includes a slot offset, a frame offset, a periodicity, or an active duration for transmission of sidelink communications over the sidelink connection, or any combination thereof. In some cases, the wireless communications include sidelink communications. In some cases, the sidelink communications includes V2X communications.

In some cases, the DTX configuration is common to all sidelink connections associated with the broadcast connection associated with the second device, where the DTX configuration is common to at least the sidelink connection between the first device and the second device and a second sidelink connection between a third device and the second device. In some cases, one or more DTX configurations vary over one or more sidelink connections associated with the broadcast connection associated with the second device based on a unicast traffic load associated with the one or more sidelink connections. In some cases, the DTX configuration is common to all sidelink connections associated with the groupcast connection associated with the second device, where the DTX configuration is common to at least the sidelink connection between the first device and the second device and a second sidelink connection between a third device and the second device. In some cases, one or more DTX configurations vary over one or more sidelink connections associated with the groupcast connection associated with the second device based on a unicast traffic load associated with the one or more sidelink connections.

In some cases, the DTX configuration is exclusively for the sidelink connection. In some cases, the sidelink connection procedure includes a sidelink connection setup procedure. In some cases, the sidelink connection setup procedure includes a unicast RRC sidelink connection setup procedure. In some cases, the DTX configuration includes a pattern of one or more DTX cycles. In some cases, the DTX configuration including the pattern of the one or more DTX cycles includes a slot offset, a frame offset, a periodicity, or an active duration for transmission of sidelink communications over the sidelink connection, or any combination thereof. In some cases, the DTX configuration includes a DTX period, a DTX active duration, or a DTX offset, or any combination thereof. In some cases, one or more of the DTX period, the DTX active duration, or the DTX offset, are based on a traffic load associated with the sidelink connection. In some cases, one or more of the DTX period, the DTX active duration, or the DTX offset, are based on a DRB configuration associated with the sidelink connection.

In some cases, the wireless communications include sidelink communications. In some cases, the sidelink communications includes V2X communications. In some cases, the DTX configuration is common to all sidelink connections associated with the broadcast connection associated with the set of devices. In some cases, the DTX configuration is common to at least the sidelink connection between the first device and the second device and a second sidelink connection between a third device and the first device. In some cases, one or more DTX configurations vary over one or more sidelink connections associated with the broadcast connection associated with the set of devices based on a unicast traffic load associated with the one or more sidelink connections. In some cases, the DTX configuration is common to all sidelink connections associated with the groupcast connection, where the DTX configuration is common to at least the sidelink connection between the first device and the second device and a second sidelink connection between a third device and the first device. In some cases, one or more DTX configurations vary over one or more sidelink connections associated with the groupcast connection associated with the set of devices based on a unicast traffic load associated with the one or more sidelink connections.

The reception configuration 915 may determine a DRX configuration based on the DTX configuration. In some examples, the reception configuration 915 may transmit, to the second device, the DRX configuration for the sidelink connection. In some examples, the reception configuration 915 may transmit, to the second device, the DTX configuration. In some examples, the reception configuration 915 may receive, from the second device, a DRX configuration for the sidelink connection between the first device and the second device based on the DTX configuration. In some examples, the reception configuration 915 may receive a set of DRX configurations from a set of devices, including the second device, for a set of sidelink connections, including the sidelink connection between the first device and the second device.

In some cases, the DRX configuration includes a pattern of one or more DRX cycles. In some cases, the DRX configuration including the pattern of the one or more DRX cycles includes a slot offset, a frame offset, a periodicity, or an active duration for reception of sidelink communications over the sidelink connection, or any combination thereof. In some cases, the DRX configuration includes a pattern of one or more DRX cycles. In some cases, the DRX configuration including the pattern of the one or more DRX cycles includes a slot offset, a frame offset, a periodicity, or an active duration for reception of sidelink communications over the sidelink connection, or any combination thereof.

The adjustment component 920 may transmit, to the second device, a request message including a request to adjust a parameter associated with the DTX configuration, where the parameter includes one or more of a DTX period, a DTX active duration, or a DTX offset, or any combination thereof, where determining the DRX configuration is based on the request to adjust the parameter associated with the DTX configuration. In some examples, the adjustment component 920 may receive, from the second device, a response message, related to the request to adjust the parameter associated with the DTX configuration, based on the request message, where determining the DRX configuration is based on the response message. In some examples, transmitting, to a third device, a request message including a request to adjust a parameter associated with a corresponding DTX configuration associated with the third device, where the parameter includes one or more of a DTX period, a DTX active duration, or a DTX offset, or any combination thereof, where determining the DRX configuration is based on the request to adjust the parameter associated with the corresponding DTX configuration associated with the third device.

In some examples, the adjustment component 920 may adjust a pattern of one or more DRX cycles based on the received DTX configuration from the second device for the sidelink connection. In some examples, the adjustment component 920 may transmit, an indication of the adjusted pattern, to the set of devices for each device of the set of devices to align a DTX occasion, where the first device has a corresponding sidelink connection with each device of the set of devices. In some examples, the adjustment component 920 may adjust a pattern of one or more DRX cycles associated with the DRX configuration based on a trigger. In some examples, the adjustment component 920 may transmit an update message to the second device based on the adjusting, the update message including an RRC update message including a DTX offset adjustment request.

In some examples, adjustment component 920 may receive, from the second device, a request message including a request to adjust a parameter associated with the DTX configuration, where the parameter includes one or more of a DTX period, a DTX active duration, or a DTX offset, or any combination thereof. In some examples, the adjustment component 920 may transmit, to the second device, a response message, related to the request to adjust the parameter associated with the DTX configuration, based on the request message. In some cases, the response message indicates one or more of an adjusted DTX period, an adjusted DTX active duration, or an adjusted DTX offset, or any combination thereof. In some cases, the response message indicates a cause for rejecting the request to adjust the parameter associated with the DTX configuration. In some cases, the trigger includes a new sidelink connection or a new sidelink application, or both. In some cases, the response message indicates one or more of an adjusted DTX period, an adjusted DTX active duration, or an adjusted DTX offset, or any combination thereof. In some cases, the response message indicates a cause for rejecting the request to adjust the parameter associated with the DTX configuration.

The capability component 925 may identify capability information. In some examples, the capability component 925 may transmit, to the second device, a message including capability information associated with the first device, the message including an RRC connection message. In some examples, the capability component 925 may enable a DRX reconfiguration mode based on the capability information. In some examples, the capability component 925 may monitor one or more DRX cycles based on the DRX configuration. In some examples, the capability component 925 may activate a DRX timer based on the monitoring.

In some examples, the capability component 925 may determine an absence of data from the second device during the one or more DRX cycles based on the monitoring, where activating the DRX timer is based on the absence of data from the second device during the one or more DRX cycles. In some examples, the capability component 925 may adjust a pattern of one or more DRX cycles associated with the DRX configuration based on the DRX timer lapsing. In some examples, the capability component 925 may modify a length of the one or more DRX cycles. In some examples, the capability component 925 may transmit, to the second device, an indication of the modified length of the one or more DRX cycles.

The parameter component 930 may identify, based on the DTX configuration, a DTX period, a DTX active duration, or a DTX offset, or any combination thereof, where determining the DRX configuration is based on the DTX period, the DTX active duration, or the DTX offset, or any combination thereof. In some cases, one or more of the DTX period, the DTX active duration, or the DTX offset, are based on a traffic load associated with the sidelink connection. In some cases, one or more of the DTX period, the DTX active duration, or the DTX offset, are based on a data radio bearer configuration associated with the sidelink connection.

Figure 10:
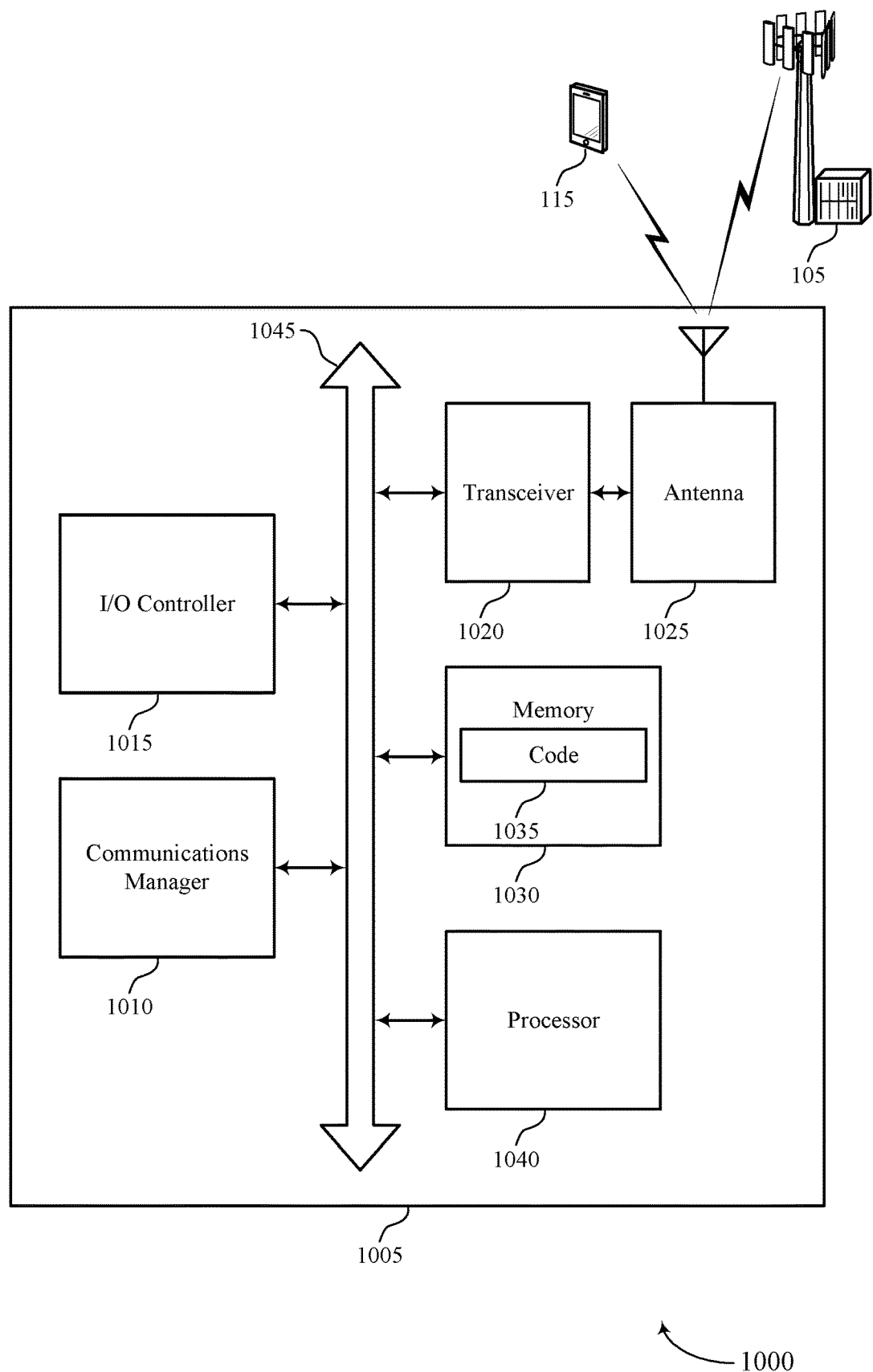
FIG. 10 shows a diagram of a system including a device in accordance with one or more aspects of the present disclosure.

FIG. 10 shows a diagram of a system 1000 including a device 1005 in accordance with one or more aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 as described herein may be implemented to realize higher reliability and lower latency sidelink operations to sidelink communications. One implementation may allow the device 1005 to reduce power consumption when providing sidelink communications in a wireless communications systems, such as in 5G systems. Another implementation may allow the device 1005 to support higher reliability and low latency sidelink operations by supporting DTX configuration and DRX configuration for sidelink communications.

The communications manager 1010 may receive, from a second device, a DTX configuration for a sidelink connection between the device 1005 and the second device, determine a DRX configuration based on the DTX configuration, and transmit, to the second device, the DRX configuration for the sidelink connection. The communications manager 1010 may also determine a DTX configuration for a sidelink connection between the device 1005 and a second device, transmit, to the second device, the DTX configuration, and receive, from the second device, a DRX configuration for the sidelink connection between the device 1005 and the second device based on the DTX configuration.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the device 1005 may include a single antenna 1025. However, in some cases, the device 1005 may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting DTX and DRX configurations for sidelink communications).

Figure 11:
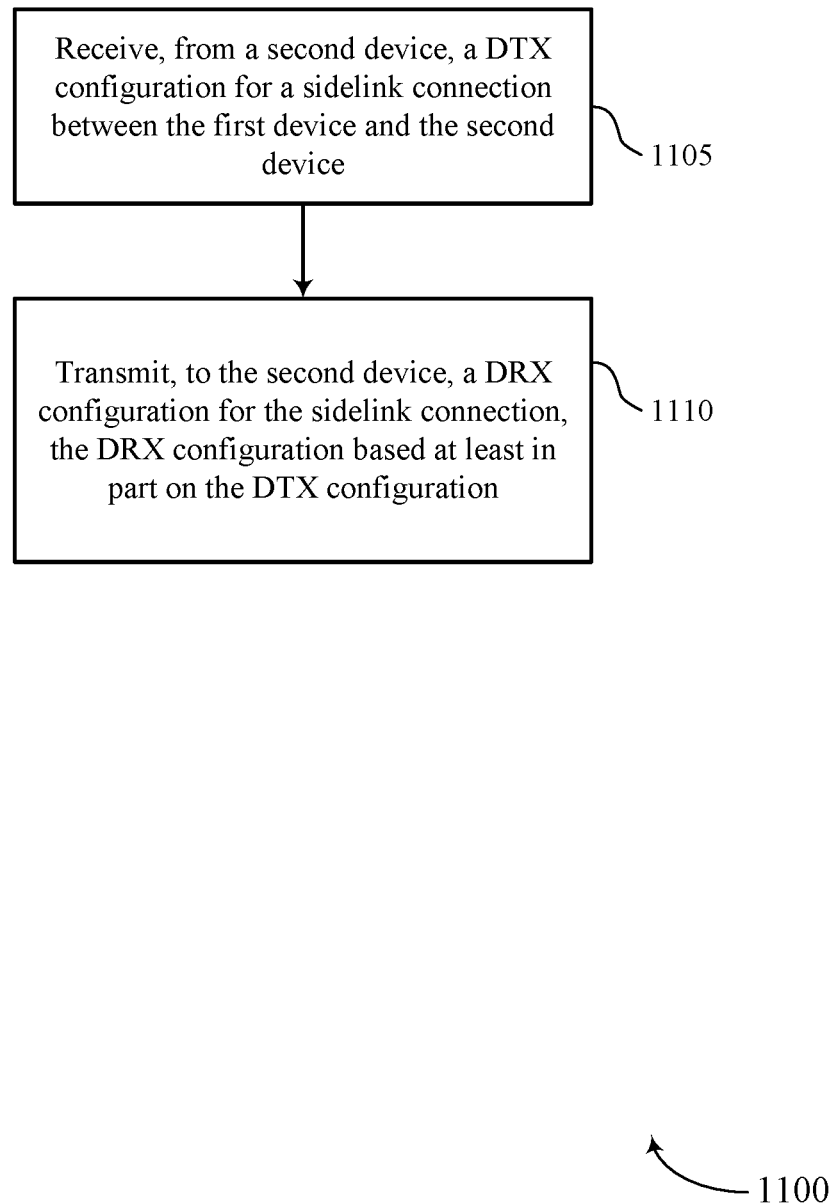
FIGS. 11 through 16 show flowcharts illustrating methods in accordance with one or more aspects of the present disclosure.

FIG. 11 shows a flowchart illustrating a method 1100 in accordance with one or more aspects of the present disclosure. The operations of method 1100 may be implemented by a UE 115 or its components as described herein. For example, the operations of method 1100 may be performed by a communications manager as described with reference to FIGS. 7 through 10. In some examples, a device (e.g., a UE 115) may execute a set of instructions to control the functional elements of the device to perform the functions described herein. Additionally or alternatively, a device may perform aspects of the functions described herein using special-purpose hardware.

At 1105, a first device may receive, from a second device, a DTX configuration for a sidelink connection between the first device and the second device. The operations of 1105 may be performed according to the methods described herein. In some examples, aspects of the operations of 1105 may be performed by a transmission configuration as described with reference to FIGS. 7 through 10.

At 1110, the first device may optionally transmit, to the second device, a DRX configuration for the sidelink connection, the DRX configuration based at least in part on the DTX configuration. The operations of 1110 may be performed according to the methods described herein. In some examples, aspects of the operations of 1110 may be performed by a reception configuration as described with reference to FIGS. 7 through 10.

Figure 12:
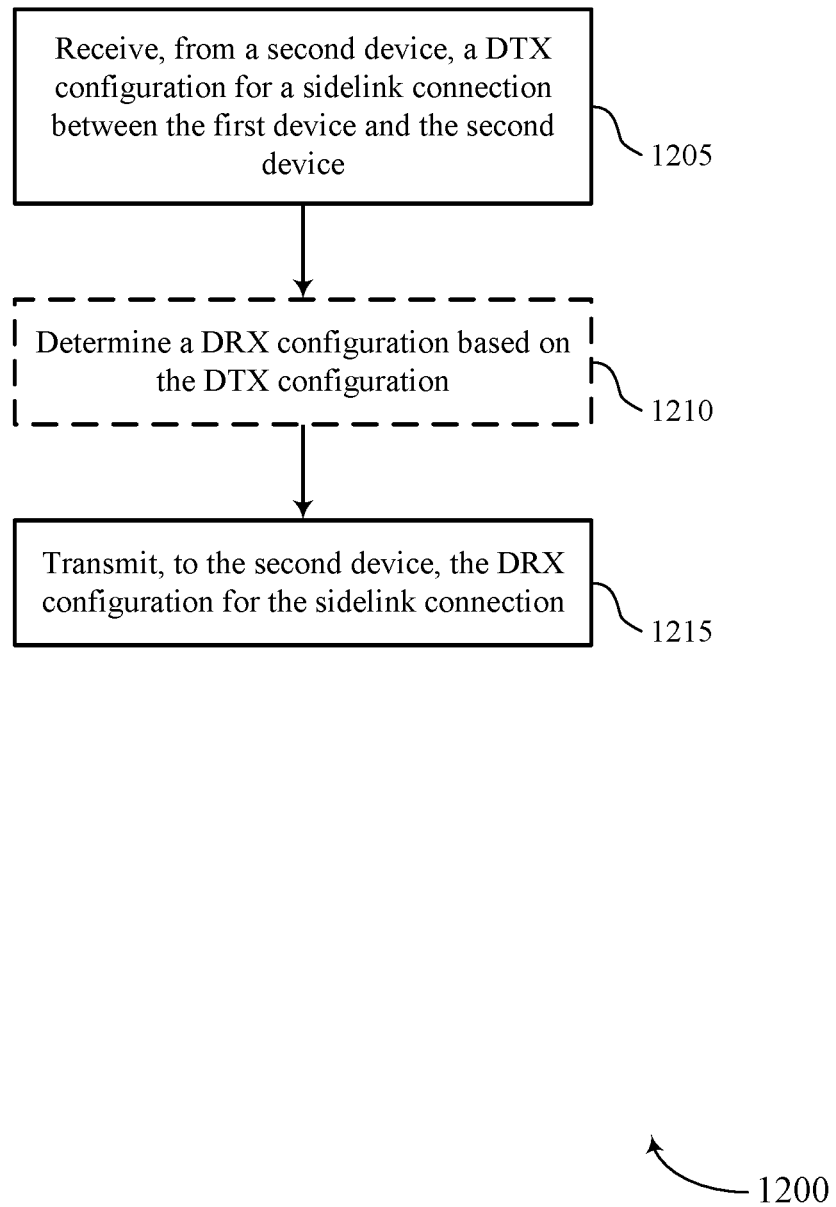

FIG. 12 shows a flowchart illustrating a method 1200 in accordance with one or more aspects of the present disclosure. The operations of method 1200 may be implemented by a UE 115 or its components as described herein. For example, the operations of method 1200 may be performed by a communications manager as described with reference to FIGS. 7 through 10. In some examples, a device (e.g., a UE 115) may execute a set of instructions to control the functional elements of the device to perform the functions described herein. Additionally or alternatively, a device may perform aspects of the functions described herein using special-purpose hardware.

At 1205, a first device may receive, from a second device, a DTX configuration for a sidelink connection between the first device and the second device. The operations of 1205 may be performed according to the methods described herein. In some examples, aspects of the operations of 1205 may be performed by a transmission configuration as described with reference to FIGS. 7 through 10.

At 1210, the first device may determine a DRX configuration based on the DTX configuration. The operations of 1210 may be performed according to the methods described herein. In some examples, aspects of the operations of 1210 may be performed by a reception configuration as described with reference to FIGS. 7 through 10.

At 1215, the first device may optionally transmit, to the second device, the DRX configuration for the sidelink connection. The operations of 1215 may be performed according to the methods described herein. In some examples, aspects of the operations of 1215 may be performed by a reception configuration as described with reference to FIGS. 7 through 10.

Figure 13:
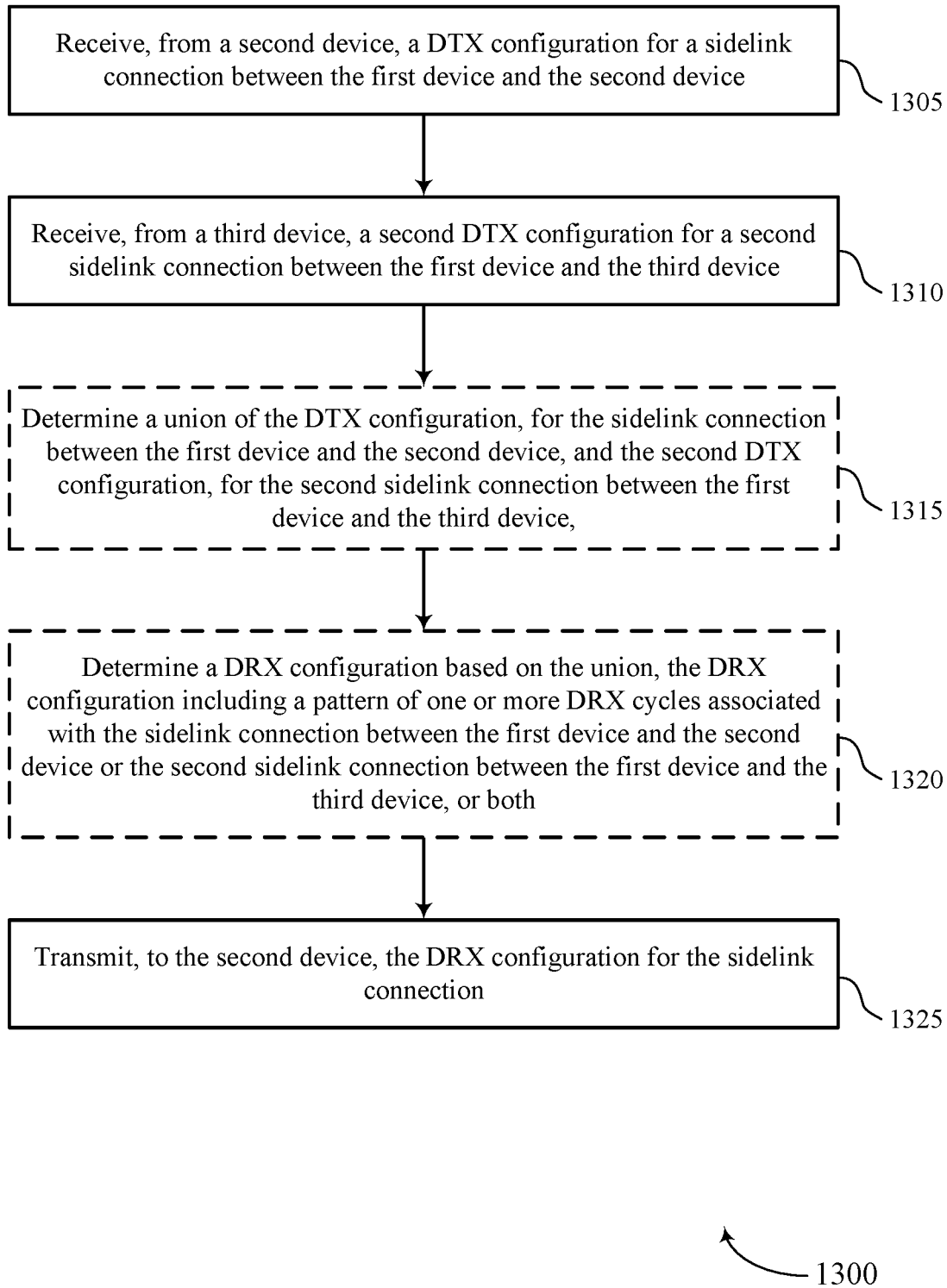

FIG. 13 shows a flowchart illustrating a method 1300 in accordance with one or more aspects of the present disclosure. The operations of method 1300 may be implemented by a UE 115 or its components as described herein. For example, the operations of method 1300 may be performed by a communications manager as described with reference to FIGS. 7 through 10. In some examples, a device (e.g., a UE 115) may execute a set of instructions to control the functional elements of the device to perform the functions described herein. Additionally or alternatively, a device may perform aspects of the functions described herein using special-purpose hardware.

At 1305, a first device may receive, from a second device, a DTX configuration for a sidelink connection between the first device and the second device. The operations of 1305 may be performed according to the methods described herein. In some examples, aspects of the operations of 1305 may be performed by a transmission configuration as described with reference to FIGS. 7 through 10.

At 1310, the first device may optionally receive, from a third device, a second DTX configuration for a second sidelink connection between the first device and the third device. The operations of 1310 may be performed according to the methods described herein. In some examples, aspects of the operations of 1310 may be performed by a transmission configuration as described with reference to FIGS. 7 through 10.

At 1315, the first device may determine a union of the DTX configuration, for the sidelink connection between the first device and the second device, and the second DTX configuration, for the second sidelink connection between the first device and the third device. The operations of 1315 may be performed according to the methods described herein. In some examples, aspects of the operations of 1315 may be performed by a transmission configuration as described with reference to FIGS. 7 through 10.

At 1320, the first device may determine a DRX configuration based on the union, the DRX configuration including a pattern of one or more DRX cycles associated with the sidelink connection between the first device and the second device or the second sidelink connection between the first device and the third device, or both. The operations of 1320 may be performed according to the methods described herein. In some examples, aspects of the operations of 1320 may be performed by a transmission configuration as described with reference to FIGS. 7 through 10.

At 1325, the first device may optionally transmit, to the second device, the DRX configuration for the sidelink connection. The operations of 1325 may be performed according to the methods described herein. In some examples, aspects of the operations of 1325 may be performed by a reception configuration as described with reference to FIGS. 7 through 10.

Figure 14:
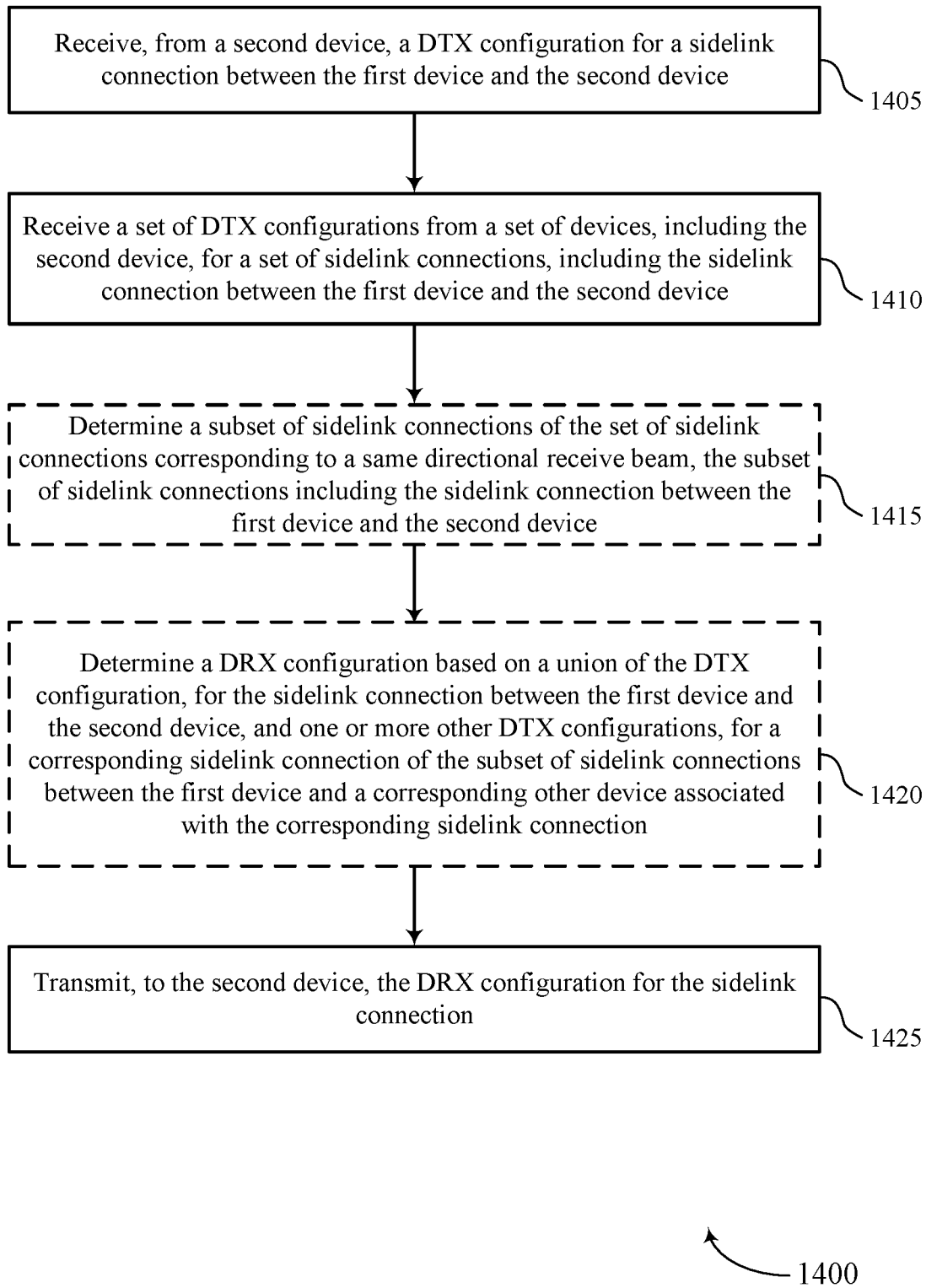

FIG. 14 shows a flowchart illustrating a method 1400 in accordance with one or more aspects of the present disclosure. The operations of method 1400 may be implemented by a UE 115 or its components as described herein. For example, the operations of method 1400 may be performed by a communications manager as described with reference to FIGS. 7 through 10. In some examples, a device (e.g., a UE 115) may execute a set of instructions to control the functional elements of the device to perform the functions described herein. Additionally or alternatively, a device may perform aspects of the functions described herein using special-purpose hardware.

At 1405, a first device may receive, from a second device, a DTX configuration for a sidelink connection between the first device and the second device. The operations of 1405 may be performed according to the methods described herein. In some examples, aspects of the operations of 1405 may be performed by a transmission configuration as described with reference to FIGS. 7 through 10.

At 1410, the first device may optionally receive a set of DTX configurations from a set of devices, including the second device, for a set of sidelink connections, including the sidelink connection between the first device and the second device. The operations of 1410 may be performed according to the methods described herein. In some examples, aspects of the operations of 1410 may be performed by a transmission configuration as described with reference to FIGS. 7 through 10.

At 1415, the first device may optionally determine a subset of sidelink connections of the set of sidelink connections corresponding to a same directional receive beam, the subset of sidelink connections including the sidelink connection between the first device and the second device. The operations of 1415 may be performed according to the methods described herein. In some examples, aspects of the operations of 1415 may be performed by a transmission configuration as described with reference to FIGS. 7 through 10.

At 1420, the first device may determine the DRX configuration based on a union of the DTX configuration, for the sidelink connection between the first device and the second device, and one or more other DTX configurations, for a corresponding sidelink connection of the subset of sidelink connections between the first device and a corresponding other device associated with the corresponding sidelink connection. The operations of 1420 may be performed according to the methods described herein. In some examples, aspects of the operations of 1420 may be performed by a transmission configuration as described with reference to FIGS. 7 through 10.

At 1425, the first device may optionally transmit, to the second device, the DRX configuration for the sidelink connection. The operations of 1425 may be performed according to the methods described herein. In some examples, aspects of the operations of 1425 may be performed by a reception configuration as described with reference to FIGS. 7 through 10.

Figure 15:
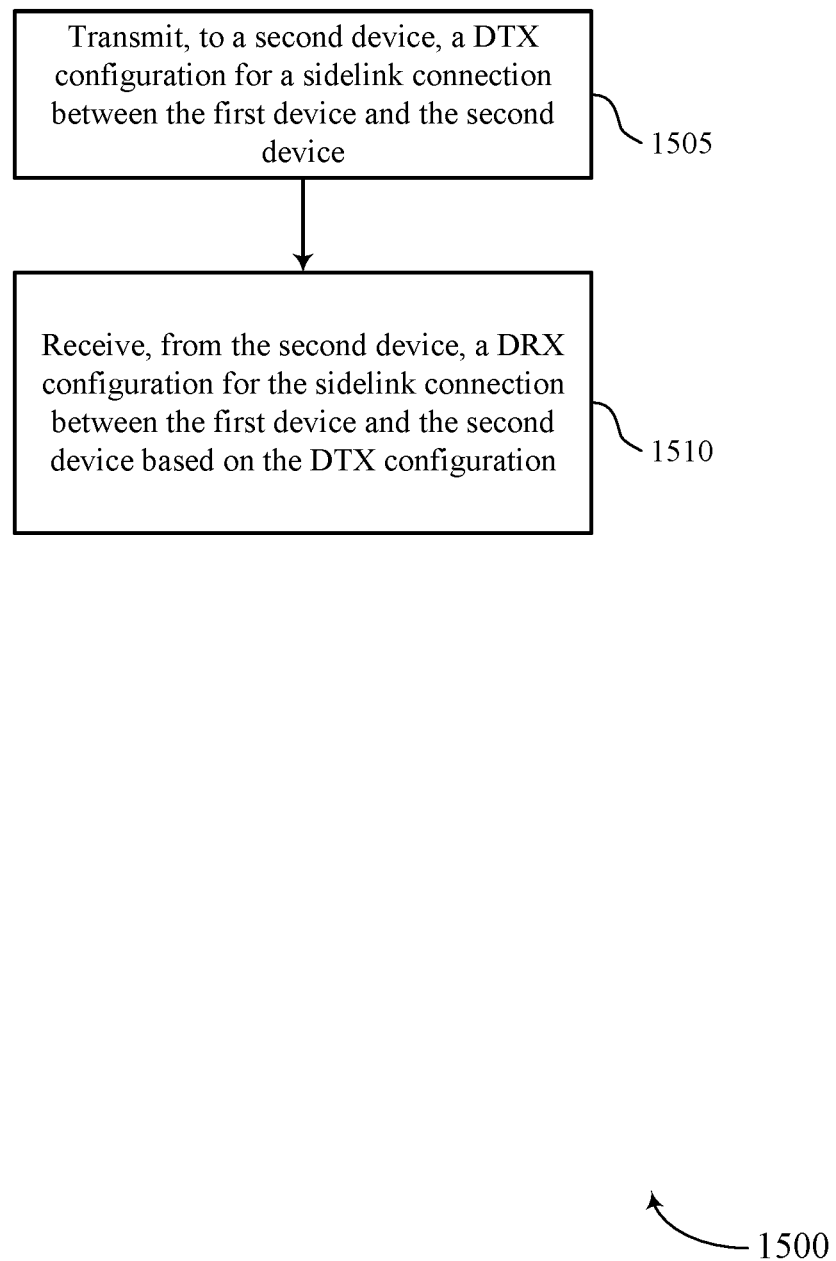

FIG. 15 shows a flowchart illustrating a method 1500 in accordance with one or more aspects of the present disclosure. The operations of method 1500 may be implemented by a UE 115 or its components as described herein. For example, the operations of method 1500 may be performed by a communications manager as described with reference to FIGS. 7 through 10. In some examples, a device (e.g., a UE 115) may execute a set of instructions to control the functional elements of the device to perform the functions described herein. Additionally or alternatively, a device may perform aspects of the functions described herein using special-purpose hardware.

At 1505, a first device may transmit, to a second device, a DTX configuration for a sidelink connection between the first device and a second device. The operations of 1505 may be performed according to the methods described herein. In some examples, aspects of the operations of 1505 may be performed by a transmission configuration as described with reference to FIGS. 7 through 10.

At 1510, the first device may optionally receive, from the second device, a DRX configuration for the sidelink connection between the first device and the second device based on the DTX configuration. The operations of 1510 may be performed according to the methods described herein. In some examples, aspects of the operations of 1510 may be performed by a reception configuration as described with reference to FIGS. 7 through 10.

Figure 16:
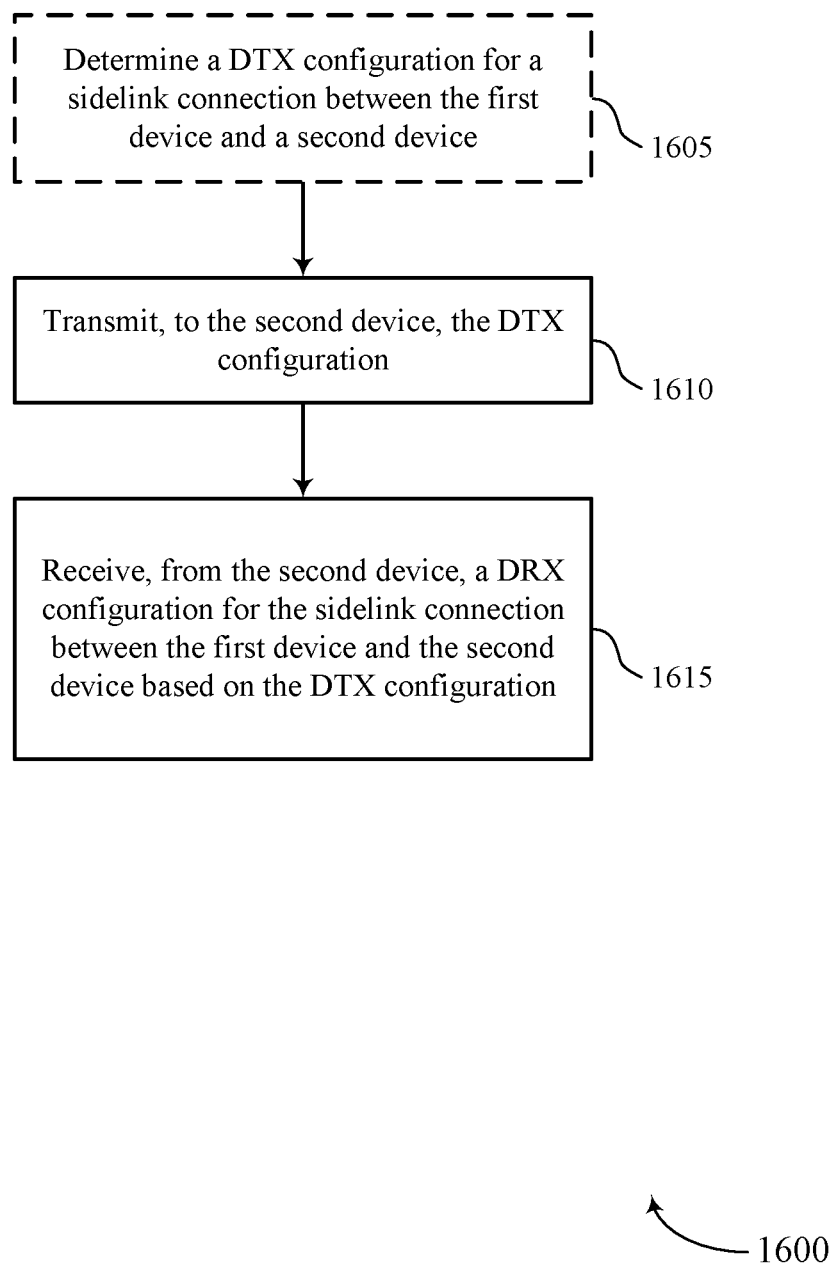

FIG. 16 shows a flowchart illustrating a method 1600 in accordance with one or more aspects of the present disclosure. The operations of method 1600 may be implemented by a UE 115 or its components as described herein. For example, the operations of method 1600 may be performed by a communications manager as described with reference to FIGS. 7 through 10. In some examples, a device (e.g., a UE 115) may execute a set of instructions to control the functional elements of the device to perform the functions described herein. Additionally or alternatively, a device may perform aspects of the functions described herein using special-purpose hardware.

At 1605, a first device may determine a DTX configuration for a sidelink connection between the first device and a second device. The operations of 1605 may be performed according to the methods described herein. In some examples, aspects of the operations of 1605 may be performed by a transmission configuration as described with reference to FIGS. 7 through 10.

At 1610, the first device may transmit, to the second device, the DTX configuration. The operations of 1610 may be performed according to the methods described herein. In some examples, aspects of the operations of 1610 may be performed by a reception configuration as described with reference to FIGS. 7 through 10.

At 1615, the first device may optionally receive, from the second device, a DRX configuration for the sidelink connection between the first device and the second device based on the DTX configuration. The operations of 1615 may be performed according to the methods described herein. In some examples, aspects of the operations of 1615 may be performed by a reception configuration as described with reference to FIGS. 7 through 10.

Figure 17:
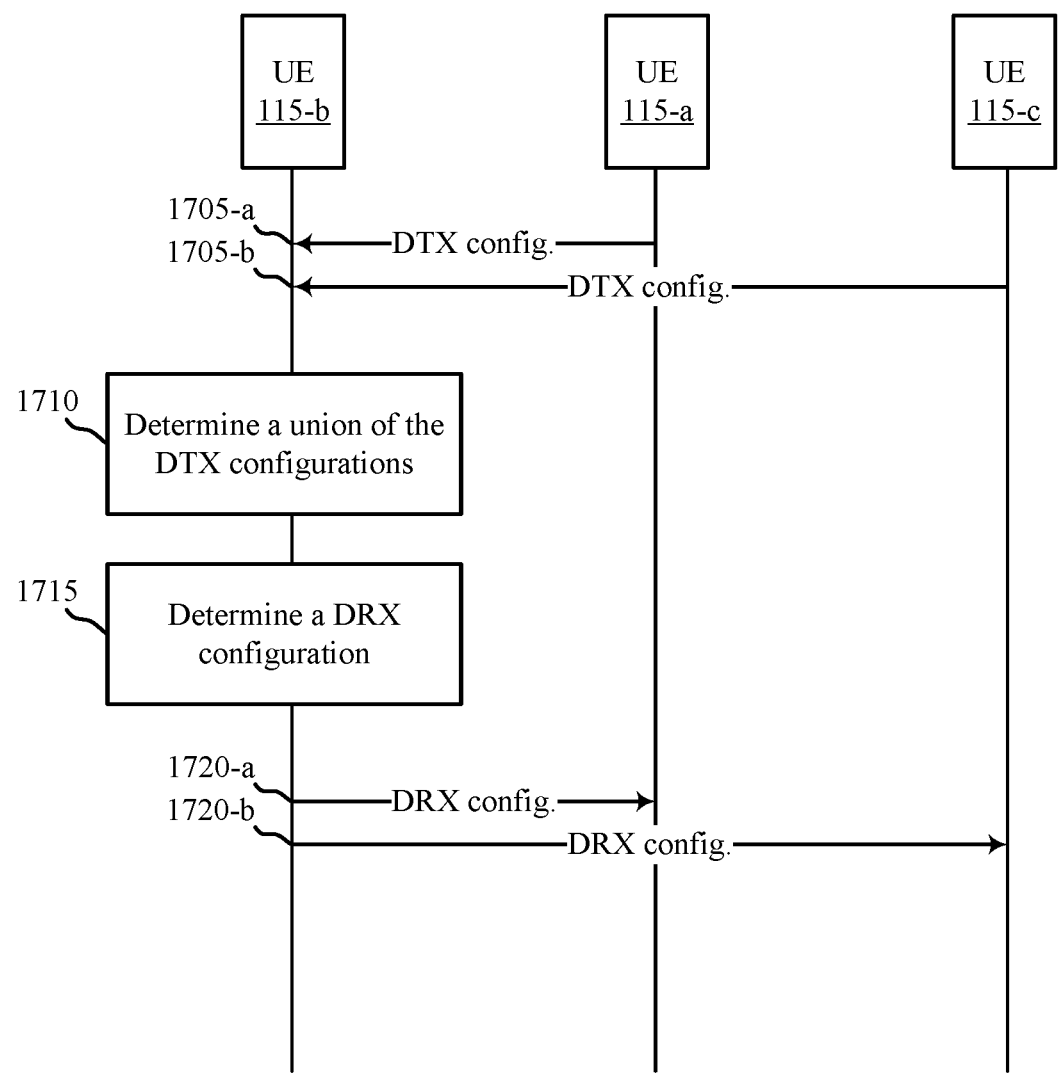
FIG. 17 shows a flow diagram illustrating methods in accordance with one or more aspects of the present disclosure.

FIG. 17 illustrates an example of a flow diagram 1700 in accordance with one or more aspects of the present disclosure. In some examples, flow diagram 1700 may implement aspects of a wireless communication system depicted herein. In the example illustrated in FIG. 17, the flow diagram 1700 may include UE 115-b, UE 115-a, and UE 115-c. In some examples, the flow diagram 1700 may be based on a configuration by UE 115-b, UE 115-a, or UE 115-b, or a combination thereof, and may be implemented by UE 115-a, UE 115-b, and UE 115-c.

At 1705, UE 115-b may receive, from UE 115-a, a discontinuous transmission configuration for a sidelink connection between UE 115-b and UE 115-a, and receive, from UE 115-c, a second discontinuous transmission configuration for a second sidelink connection between UE 115-b and UE 115-c.

At 1710, UE 115-b may determine a union of the discontinuous transmission configuration for the sidelink connection between UE 115-b and UE 115-a, and the second discontinuous transmission configuration for the second sidelink connection between UE 115-b and UE 115-c, At 1715, UE 115-b may determine a discontinuous reception configuration based on the received discontinuous transmission configurations. In some cases, UE 115-b determining a discontinuous reception configuration may be based on the union. In some cases, the discontinuous reception configuration may include a pattern of one or more discontinuous receptions cycles associated with the sidelink connection between the UE 115-b and UE 115-a device or the second sidelink connection between UE 115-b and UE 115-c, or both.

At 1720, UE 115-b may transmit, to UE 115-a, a discontinuous reception configuration for the sidelink connection, In some cases, the discontinuous reception configuration for the second sidelink connection may be based on the discontinuous transmission configuration received from UE 115-a and the union determined at 1710. At 1720, UE 115-b may transmit, to UE 115-c, a discontinuous reception configuration for the second sidelink connection. In some cases, the discontinuous reception configuration for the second sidelink connection may be based on the discontinuous transmission configuration received from UE 115-c and the union determined at 1710.

It should be noted that the methods described herein describe possible implementations, and that the operations may be rearranged or otherwise modified and that other implementations are possible. Further, aspects from two or more of the methods may be combined.

The following provides a first overview of aspects of the present disclosure:

Aspect 1: A method for wireless communications at a first device, comprising: receiving, from a second device, a discontinuous transmission configuration for a sidelink connection between the first device and the second device; and transmitting, to the second device, a discontinuous reception configuration for the sidelink connection, the discontinuous reception configuration based at least in part on the discontinuous transmission configuration.

Aspect 2: The method of aspect 1, further comprising: receiving, from a third device, a second discontinuous transmission configuration for a second sidelink connection between the first device and the third device.

Aspect 3: The method of aspect 2, further comprising: determining a union of the discontinuous transmission configuration, for the sidelink connection between the first device and the second device, and the second discontinuous transmission configuration, for the second sidelink connection between the first device and the third device, wherein determining the discontinuous reception configuration is based at least in part on the union, the discontinuous reception configuration comprising a pattern of one or more discontinuous receptions cycles associated with the sidelink connection between the first device and the second device or the second sidelink connection between the first device and the third device, or both.

Aspect 4: The method of any of aspects 1 through 3, wherein the discontinuous transmission configuration is exclusively for the sidelink connection.

Aspect 5: The method of any of aspects 1 through 4, further comprising: transmitting, to the second device, a request message comprising a request to adjust a parameter associated with the discontinuous transmission configuration, wherein the parameter comprises one or more of a discontinuous transmission period, a discontinuous transmission active duration, or a discontinuous transmission offset, or any combination thereof, wherein determining the discontinuous reception configuration is based at least in part on the request to adjust the parameter associated with the discontinuous transmission configuration.

Aspect 6: The method of aspect 5, further comprising: receiving, from the second device, a response message, related to the request to adjust the parameter associated with the discontinuous transmission configuration, based at least in part on the request message, wherein determining the discontinuous reception configuration is based at least in part on the response message.

Aspect 7: The method of aspect 6, wherein the response message indicates one or more of an adjusted discontinuous transmission period, an adjusted discontinuous transmission active duration, or an adjusted discontinuous transmission offset, or any combination thereof, and the response message indicates a cause for rejecting the request to adjust the parameter associated with the discontinuous transmission configuration.

Aspect 8: The method of any of aspects 1 through 7, further comprising: receiving a set of discontinuous transmission configurations from a set of devices, including the second device, for a set of sidelink connections, including the sidelink connection between the first device and the second device.

Aspect 9: The method of aspect 8, further comprising: determining a subset of sidelink connections of the set of sidelink connections corresponding to a same directional receive beam, the subset of sidelink connections including the sidelink connection between the first device and the second device, wherein determining the discontinuous reception configuration is based at least in part on a union of the discontinuous transmission configuration, for the sidelink connection between the first device and the second device, and one or more other discontinuous transmission configurations, for a corresponding sidelink connection of the subset of sidelink connections between the first device and a corresponding other device associated with the corresponding sidelink connection.

Aspect 10: The method of aspect 9, wherein determining the subset of sidelink connections of the set of sidelink connections corresponding to the same directional receive beam is based at least in part on a receiver spatial configuration associated with the first device.

Aspect 11: The method of any of aspects 9 through 10, wherein the discontinuous reception configuration comprises a pattern of one or more discontinuous receptions cycles, each discontinuous reception cycle of the pattern corresponding to at least one of: a different peak quality-of-service metric of a corresponding discontinuous transmission configuration of the one or more other discontinuous transmission configurations, or a different traffic throughput metric of the corresponding discontinuous transmission configuration of the one or more other discontinuous transmission configurations, or a different spectral efficiency metric of the corresponding discontinuous transmission configuration of the one or more other discontinuous transmission configurations, or a different reference signal received power metric of the corresponding discontinuous transmission configuration of the one or more other discontinuous transmission configurations, or a different reference signal received quality metric of the corresponding discontinuous transmission configuration of the one or more other discontinuous transmission configurations, or any combination thereof.

Aspect 12: The method of any of aspects 1 through 11, further comprising: transmitting, to a third device, a request message comprising a request to adjust a parameter associated with a corresponding discontinuous transmission configuration associated with the third device, wherein the parameter comprises one or more of a discontinuous transmission period, a discontinuous transmission active duration, or a discontinuous transmission offset, or any combination thereof, wherein determining the discontinuous reception configuration is based at least in part on the request to adjust the parameter associated with the corresponding discontinuous transmission configuration associated with the third device.

Aspect 13: The method of any of aspects 1 through 12, further comprising: transmitting the discontinuous transmission configuration and the discontinuous reception configuration to a set of devices, including the second device, for a set of sidelink connections, including the sidelink connection between the first device and the second device.

Aspect 14: The method of aspect 13, wherein transmitting the discontinuous reception configuration comprises: transmitting the discontinuous transmission configuration and the discontinuous reception configuration to the set of devices, including the second device, for the set of sidelink connections, including the sidelink connection between the first device and the second device, based at least in part on a corresponding device identifier associated with each device of the set of devices.

Aspect 15: A method for wireless communications at a first device, comprising: transmitting, to a second device, a discontinuous transmission configuration for a sidelink connection between the first device and the second device; and receiving, from the second device, a discontinuous reception configuration for the sidelink connection between the first device and the second device based at least in part on the discontinuous transmission configuration.

Aspect 16: The method of aspect 15, wherein the discontinuous transmission configuration is exclusively for the sidelink connection.

Aspect 17: The method of any of aspects 15 through 16, further comprising: receiving, from the second device, a request message comprising a request to adjust a parameter associated with the discontinuous transmission configuration, wherein the parameter comprises one or more of a discontinuous transmission period, a discontinuous transmission active duration, or a discontinuous transmission offset, or any combination thereof.

Aspect 18: The method of aspect 17, further comprising: transmitting, to the second device, a response message, related to the request to adjust the parameter associated with the discontinuous transmission configuration, based at least in part on the request message.

Aspect 19: The method of aspect 18, wherein the response message indicates one or more of an adjusted discontinuous transmission period, an adjusted discontinuous transmission active duration, or an adjusted discontinuous transmission offset, or any combination thereof.

Aspect 20: The method of any of aspects 18 through 19, wherein the response message indicates a cause for rejecting the request to adjust the parameter associated with the discontinuous transmission configuration.

Aspect 21: The method of any of aspects 15 through 20, wherein transmitting the discontinuous transmission configuration comprises: transmitting the discontinuous transmission configuration based at least in part on a sidelink connection procedure.

Aspect 22: The method of aspect 21, wherein the sidelink connection procedure comprises a sidelink connection setup procedure.

Aspect 23: The method of aspect 22, wherein the sidelink connection setup procedure comprises a unicast radio resource control sidelink connection setup procedure.

Aspect 24: The method of aspect 23, wherein transmitting the discontinuous transmission configuration comprises: transmitting the discontinuous transmission configuration in a radio resource control configuration message during the unicast radio resource control sidelink connection setup procedure.

Aspect 25: The method of any of aspects 15 through 24, wherein the discontinuous transmission configuration comprises a pattern of one or more discontinuous transmission cycles.

Aspect 26: The method of aspect 25, wherein the discontinuous transmission configuration including the pattern of the one or more discontinuous transmission cycles comprises a slot offset, a frame offset, a periodicity, or an active duration for transmission of sidelink communications over the sidelink connection, or any combination thereof.

Aspect 27: The method of any of aspects 15 through 26, wherein the discontinuous reception configuration comprises a pattern of one or more discontinuous reception cycles.

Aspect 28: The method of aspect 27, wherein the discontinuous reception configuration including the pattern of the one or more discontinuous reception cycles comprises a slot offset, a frame offset, a periodicity, or an active duration for reception of sidelink communications over the sidelink connection, or any combination thereof.

Aspect 29: An apparatus for wireless communications at a first device, comprising a processor; and memory coupled to the processor, the processor and memory configured to perform a method of any of aspects 1 through 14.

Aspect 30: An apparatus for wireless communications at a first device, comprising at least one means for performing a method of any of aspects 1 through 14.

Aspect 31: A non-transitory computer-readable medium storing code for wireless communications at a first device, the code comprising instructions executable by a processor to perform a method of any of aspects 1 through 14.

Aspect 32: An apparatus for wireless communications at a first device, comprising a processor; and memory coupled with the processor, the processor and memory configured to perform a method of any of aspects 15 through 28.

Aspect 33: An apparatus for wireless communications at a first device, comprising at least one means for performing a method of any of aspects 15 through 28.

Aspect 34: A non-transitory computer-readable medium storing code for wireless communications at a first device, the code comprising instructions executable by a processor to perform a method of any of aspects 15 through 28.

Aspect 35: A method for wireless communications at a first device, comprising: receiving, from a second device, a DTX configuration for a sidelink connection between the first device and the second device; determining a DRX configuration based at least in part on the DTX configuration; and transmitting, to the second device, the DRX configuration for the sidelink connection.

Aspect 36: The method of aspect 35, wherein the DTX configuration is exclusively for the sidelink connection.

Aspect 37: The method of aspect 35 or 36, further comprising: receiving, from a third device, a second DTX configuration for a second sidelink connection between the first device and the third device.

Aspect 38: The method of any of aspects 35 to 37, further comprising: determining a union of the DTX configuration, for the sidelink connection between the first device and the second device, and the second DTX configuration, for the second sidelink connection between the first device and the third device, wherein determining the DRX configuration is based at least in part on the union, the DRX configuration comprising a pattern of one or more DRXs cycles associated with the sidelink connection between the first device and the second device or the second sidelink connection between the first device and the third device, or both.

Aspect 39: The method of any of aspects 35 to 38 further comprising: receiving a set of DTX configurations from a set of devices, including the second device, for a set of sidelink connections, including the sidelink connection between the first device and the second device.

Aspect 40: The method of aspect 39, further comprising: determining a subset of sidelink connections of the set of sidelink connections corresponding to a same directional receive beam, the subset of sidelink connections including the sidelink connection between the first device and the second device, wherein determining the DRX configuration is based at least in part on a union of the DTX configuration, for the sidelink connection between the first device and the second device, and one or more other DTX configurations, for a corresponding sidelink connection of the subset of sidelink connections between the first device and a corresponding other device associated with the corresponding sidelink connection.

Aspect 41: The method of aspect 40, wherein determining the subset of sidelink connections of the set of sidelink connections corresponding to the same directional receive beam is based at least in part on a receiver spatial configuration associated with the first device.

Aspect 42: The method of aspect 40, wherein the DRX configuration comprises a pattern of one or more DRX cycles, each DRX cycle of the pattern corresponding to a different peak QoS metric of a corresponding DTX configuration of the one or more other DTX configurations.

Aspect 43: The method of aspect 40, wherein the DRX configuration comprises a pattern of one or more DRX cycles, each DRX cycle of the pattern corresponding to a different traffic throughput metric of a corresponding DTX configuration of the one or more other DTX configurations.

Aspect 44: The method of aspect 40, wherein the DRX configuration comprises a pattern of one or more DRX cycles, each DRX cycle of the pattern corresponding to a different spectral efficiency metric of a corresponding DTX configuration of the one or more other DTX configurations.

Aspect 45: The method of aspect 40, wherein the DRX configuration comprises a pattern of one or more DRX cycles, each DRX cycle of the pattern corresponding to a different RSRP metric of a corresponding DTX configuration of the one or more other DTX configurations.

Aspect 46: The method of aspect 40, wherein the DRX configuration comprises a pattern of one or more DRX cycles, each DRX cycle of the pattern corresponding to a different RSRQ metric of a corresponding DTX configuration of the one or more other DTX configurations.

Aspect 47: The method of any of aspects 35 to 46, further comprising: transmitting, to the second device, a request message comprising a request to adjust a parameter associated with the DTX configuration, wherein the parameter comprises one or more of a DTX period, a DTX active duration, or a DTX offset, or any combination thereof, wherein determining the DRX configuration is based at least in part on the request to adjust the parameter associated with the DTX configuration.

Aspect 48: The method of aspect 47, further comprising: receiving, from the second device, a response message, related to the request to adjust the parameter associated with the DTX configuration, based at least in part on the request message, wherein determining the DRX configuration is based at least in part on the response message.

Aspect 49: The method of aspect 48, wherein the response message indicates one or more of an adjusted DTX period, an adjusted DTX active duration, or an adjusted DTX offset, or any combination thereof.

Aspect 50: The method of aspect 48, wherein the response message indicates a cause for rejecting the request to adjust the parameter associated with the DTX configuration.

Aspect 51: The method of any of aspects 35 to 50, further comprising: transmitting, to a third device, a request message comprising a request to adjust a parameter associated with a corresponding DTX configuration associated with the third device, wherein the parameter comprises one or more of a DTX period, a DTX active duration, or a DTX offset, or any combination thereof, wherein determining the DRX configuration is based at least in part on the request to adjust the parameter associated with the corresponding DTX configuration associated with the third device.

Aspect 52: The method of any of aspects 35 to 51, further comprising: transmitting the DTX configuration and the DRX configuration to a set of devices, including the second device, for a set of sidelink connections, including the sidelink connection between the first device and the second device.

Aspect 53: The method of aspect 52, wherein transmitting the DRX configuration comprises: transmitting the DTX configuration and the DRX configuration to the set of devices, including the second device, for the set of sidelink connections, including the sidelink connection between the first device and the second device, based at least in part on a corresponding device identifier associated with each device of the set of devices.

Aspect 54: The method of any of aspects 35 to 53, further comprising: receiving a set of DRX configurations from a set of devices, including the second device, for a set of sidelink connections, including the sidelink connection between the first device and the second device.

Aspect 55: The method of any of aspects 35 to 54, further comprising: adjusting a pattern of one or more DRX cycles based at least in part on the received DTX configuration from the second device for the sidelink connection.

Aspect 56: The method of aspect 55, further comprising: transmitting, an indication of the adjusted pattern, to the set of devices for each device of the set of devices to align a DTX occasion, wherein the first device has a corresponding sidelink connection with each device of the set of devices.

Aspect 57: The method of any of aspects 35 to 56, further comprising: adjusting a pattern of one or more DRX cycles associated with the DRX configuration based at least in part on a trigger; and transmitting an update message to the second device based at least in part on the adjusting, the update message comprising a RRC update message including a DTX offset adjustment request.

Aspect 58: The method of aspect 57, wherein the trigger comprises a new sidelink connection or a new sidelink application, or both.

Aspect 59: The method of any of aspects 35 to 58, further comprising: identifying capability information; and transmitting, to the second device, a message comprising capability information associated with the first device, the message comprising an RRC connection message.

Aspect 60: The method of aspect 59, further comprising: enabling a DRX reconfiguration mode based at least in part on the capability information.

Aspect 61: The method of aspect 59, further comprising: monitoring one or more DRX cycles based at least in part on the DRX configuration; and activating a DRX timer based at least in part on the monitoring.

Aspect 62: The method of aspect 61, further comprising: determining an absence of data from the second device during the one or more DRX cycles based at least in part on the monitoring, wherein activating the DRX timer is based at least in part on the absence of data from the second device during the one or more DRX cycles.

Aspect 63: The method of aspect 61, further comprising: adjusting a pattern of one or more DRX cycles associated with the DRX configuration based at least in part on the DRX timer lapsing.

Aspect 64: The method of aspect 63, wherein adjusting the pattern of the one or more DRX cycles comprises: modifying a length of the one or more DRX cycles.

Aspect 65: The method of aspect 64, further comprising: transmitting, to the second device, an indication of the modified length of the one or more DRX cycles.

Aspect 66: The method of any of aspects 35 to 65, wherein receiving the DTX configuration comprises: receiving the DTX configuration based at least in part on a sidelink connection procedure.

Aspect 67: The method of aspect 66, wherein the sidelink connection procedure comprises a sidelink connection setup procedure.

Aspect 68: The method of aspect 67, wherein the sidelink connection setup procedure comprises a unicast RRC sidelink connection setup procedure.

Aspect 69: The method of aspect 68, wherein receiving the DTX configuration comprises: receiving the DTX configuration in an RRC configuration message during the unicast RRC sidelink connection setup procedure.

Aspect 70: The method of any of aspects 35 to 69, wherein the DTX configuration comprises a pattern of one or more DTX cycles.

Aspect 71: The method of aspect 70, wherein the DTX configuration including the pattern of the one or more DTX cycles comprises a slot offset, a frame offset, a periodicity, or an active duration for transmission of sidelink communications over the sidelink connection, or any combination thereof.

Aspect 72: The method of any of aspects 35 to 71, wherein the DRX configuration comprises a pattern of one or more DRX cycles.

Aspect 73: The method of aspect 72, wherein the DRX configuration including the pattern of the one or more DRX cycles comprises a slot offset, a frame offset, a periodicity, or an active duration for reception of sidelink communications over the sidelink connection, or any combination thereof.

Aspect 74: The method of any of aspects 35 to 73, further comprising: identifying, based at least in part on the DTX configuration, a DTX period, a DTX active duration, or a DTX offset, or any combination thereof, wherein determining the DRX configuration is based at least in part on the DTX period, the DTX active duration, or the DTX offset, or any combination thereof.

Aspect 75: The method of aspect 74, wherein one or more of the DTX period, the DTX active duration, or the DTX offset, are based at least in part on a traffic load associated with the sidelink connection.

Aspect 76: The method of aspect 74, wherein one or more of the DTX period, the DTX active duration, or the DTX offset, are based at least in part on a data radio bearer configuration associated with the sidelink connection.

Aspect 77: The method of any of aspects 35 to 76, wherein the wireless communications comprises sidelink communications.

Aspect 78: The method of aspect 77, wherein the sidelink communications comprises vehicle-to-everything communications.

Aspect 79: The method of any of aspects 35 to 78, wherein receiving the DTX configuration for the sidelink connection is based at least in part on a broadcast connection associated with the second device.

Aspect 80: The method of aspect 79, wherein the DTX configuration is common to all sidelink connections associated with the broadcast connection associated with the second device, wherein the DTX configuration is common to at least the sidelink connection between the first device and the second device and a second sidelink connection between a third device and the second device.

Aspect 81: The method of aspect 79, wherein one or more DTX configurations vary over one or more sidelink connections associated with the broadcast connection associated with the second device based at least in part on a unicast traffic load associated with the one or more sidelink connections.

Aspect 82: The method of any of aspects 35 to 47, wherein receiving the DTX configuration for the sidelink connection is based at least in part on a groupcast connection associated with the second device.

Aspect 83: The method of aspect 82, wherein the DTX configuration is common to all sidelink connections associated with the groupcast connection associated with the second device, wherein the DTX configuration is common to at least the sidelink connection between the first device and the second device and a second sidelink connection between a third device and the second device.

Aspect 84: The method of aspect 82, wherein one or more DTX configurations vary over one or more sidelink connections associated with the groupcast connection associated with the second device based at least in part on a unicast traffic load associated with the one or more sidelink connections.

Aspect 85: A method for wireless communication at a first device, comprising: determining a DTX configuration for a sidelink connection between the first device and a second device; transmitting, to the second device, the DTX configuration; and receiving, from the second device, a DRX configuration for the sidelink connection between the first device and the second device based at least in part on the DTX configuration.

Aspect 86: The method of aspect 85, wherein the DTX configuration is exclusively for the sidelink connection.

Aspect 87: The method of aspect 85 or 86, further comprising: receiving, from the second device, a request message comprising a request to adjust a parameter associated with the DTX configuration, wherein the parameter comprises one or more of a DTX period, a DTX active duration, or a DTX offset, or any combination thereof.

Aspect 88: The method of aspect 87, further comprising: transmitting, to the second device, a response message, related to the request to adjust the parameter associated with the DTX configuration, based at least in part on the request message.

Aspect 89: The method of aspect 88, wherein the response message indicates one or more of an adjusted DTX period, an adjusted DTX active duration, or an adjusted DTX offset, or any combination thereof.

Aspect 90: The method of aspect 88, wherein the response message indicates a cause for rejecting the request to adjust the parameter associated with the DTX configuration.

Aspect 91: The method of any of aspects 85 to 90, wherein transmitting the DTX configuration comprises: transmitting the DTX configuration based at least in part on a sidelink connection procedure.

Aspect 92: The method of aspect 91, wherein the sidelink connection procedure comprises a sidelink connection setup procedure.

Aspect 93: The method of aspect 92, wherein the sidelink connection setup procedure comprises a unicast RRC sidelink connection setup procedure.

Aspect 94: The method of aspect 93, wherein transmitting the DTX configuration comprises: transmitting the DTX configuration in an RRC configuration message during the unicast RRC sidelink connection setup procedure.

Aspect 95: The method of any of aspects 85 to 94, wherein the DTX configuration comprises a pattern of one or more DTX cycles.

Aspect 96: The method of aspect 95, wherein the DTX configuration including the pattern of the one or more DTX cycles comprises a slot offset, a frame offset, a periodicity, or an active duration for transmission of sidelink communications over the sidelink connection, or any combination thereof.

Aspect 97: The method of any of aspects 85 to 96, wherein the DRX configuration comprises a pattern of one or more DRX cycles.

Aspect 98: The method of aspect 97, wherein the DRX configuration including the pattern of the one or more DRX cycles comprises a slot offset, a frame offset, a periodicity, or an active duration for reception of sidelink communications over the sidelink connection, or any combination thereof.

Aspect 99: The method of any of aspects 85 to 98, wherein the DTX configuration comprises a DTX period, a DTX active duration, or a DTX offset, or any combination thereof.

Aspect 100: The method of aspect 99, wherein one or more of the DTX period, the DTX active duration, or the DTX offset, are based at least in part on a traffic load associated with the sidelink connection.

Aspect 101: The method of aspect 99, wherein one or more of the DTX period, the DTX active duration, or the DTX offset, are based at least in part on a data radio bearer configuration associated with the sidelink connection.

Aspect 102: The method of any of aspects 85 to 101, wherein the wireless communications comprises sidelink communications.

Aspect 103: The method of aspect 102, wherein the sidelink communications comprises vehicle-to-everything communications.

Aspect 104: The method of any of aspects 85 to 103, wherein transmitting the DTX configuration comprises: broadcasting the DTX configuration to a set of devices, including the second device, based at least in part on a broadcast connection associated with the set of devices.

Aspect 105: The method of aspect 104, wherein the DTX configuration is common to all sidelink connections associated with the broadcast connection associated with the set of devices.

Aspect 106: The method of aspect 105, wherein the DTX configuration is common to at least the sidelink connection between the first device and the second device and a second sidelink connection between a third device and the first device.

Aspect 107: The method of aspect 104, wherein one or more DTX configurations vary over one or more sidelink connections associated with the broadcast connection associated with the set of devices based at least in part on a unicast traffic load associated with the one or more sidelink connections.

Aspect 108: The method of any of aspects 85 to 107, wherein transmitting the DTX configuration comprises: transmitting the DTX configuration to a set of devices, including the second device, based at least in part on a groupcast connection associated with the set of devices.

Aspect 109: The method of aspect 108, wherein the DTX configuration is common to all sidelink connections associated with the groupcast connection, wherein the DTX configuration is common to at least the sidelink connection between the first device and the second device and a second sidelink connection between a third device and the first device.

Aspect 110: The method of aspect 108, wherein one or more DTX configurations vary over one or more sidelink connections associated with the groupcast connection associated with the set of devices based at least in part on a unicast traffic load associated with the one or more sidelink connections.

Aspect 111. An apparatus for wireless communications comprising a processor; and memory coupled to the processor, the processor and memory configured to perform a method of any of aspects 35 to 84.

Aspect 112. An apparatus for wireless communications comprising at least one means for performing a method of any of aspects 35 to 84.

Aspect 113. A non-transitory computer-readable medium storing code for wireless communications, the code comprising instructions executable by a processor to perform a method of any of aspects 35 to 84.

Aspect 114. An apparatus for wireless communications comprising a processor; and memory coupled to the processor, the processor and memory configured to perform a method of any of aspects 85 to 110.

Aspect 115. An apparatus for wireless communications comprising at least one means for performing a method of any of aspects 85 to 110.

Aspect 116. A non-transitory computer-readable medium storing code for wireless communications, the code comprising instructions executable by a processor to perform a method of any of aspects 85 to 110.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "improvements over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a first device, comprising:
   receiving, from a second device over a sidelink connection, a discontinuous transmission configuration, separate from a discontinuous reception configuration, for the sidelink connection between the first device and the second device, the discontinuous transmission configuration indicative of a periodicity associated with resources in which the second device transmits signaling;
   transmitting, to the second device, a request message comprising a request to adjust a parameter associated with the discontinuous transmission configuration, wherein the parameter comprises one or more of a discontinuous transmission period, a discontinuous transmission active duration, or a discontinuous transmission offset, or a combination thereof; and
   transmitting, to the second device over the sidelink connection, the discontinuous reception configuration for the sidelink connection, the discontinuous reception configuration based at least in part on the request to adjust the parameter associated with the discontinuous transmission configuration and indicative of a periodicity associated with resources in which the first device receives signaling, wherein the discontinuous transmission configuration and the discontinuous reception configuration are different.

2. The method of claim 1, further comprising:
   receiving, from a third device, a second discontinuous transmission configuration for a second sidelink connection between the first device and the third device.

3. The method of claim 2, further comprising:
   determining a union of the discontinuous transmission configuration, for the sidelink connection between the first device and the second device, and the second discontinuous transmission configuration, for the second sidelink connection between the first device and the third device,
   wherein determining the discontinuous reception configuration is based at least in part on the union, the discontinuous reception configuration comprising a pattern of one or more discontinuous receptions cycles associated with the sidelink connection between the first device and the second device or the second sidelink connection between the first device and the third device, or both.

4. The method of claim 1, wherein the discontinuous transmission configuration is exclusively for the sidelink connection.

5. The method of claim 1, further comprising:
   receiving, from the second device, a response message, related to the request to adjust the parameter associated with the discontinuous transmission configuration, based at least in part on the request message,
   wherein determining the discontinuous reception configuration is based at least in part on the response message.

6. The method of claim 5, wherein the response message indicates one or more of an adjusted discontinuous transmission period, an adjusted discontinuous transmission active duration, or an adjusted discontinuous transmission offset, or any combination thereof, and wherein the response message indicates a cause for rejecting the request to adjust the parameter associated with the discontinuous transmission configuration.

7. The method of claim 1, further comprising:
   receiving a set of discontinuous transmission configurations from a set of devices, including the second device, for a set of sidelink connections, including the sidelink connection between the first device and the second device.

8. The method of claim 7, further comprising:
   determining a subset of sidelink connections of the set of sidelink connections corresponding to a same directional receive beam, the subset of sidelink connections including the sidelink connection between the first device and the second device,
   wherein determining the discontinuous reception configuration is based at least in part on a union of the discontinuous transmission configuration, for the sidelink connection between the first device and the second device, and one or more other discontinuous transmission configurations, for a corresponding sidelink connection of the subset of sidelink connections between the first device and a corresponding other device associated with the corresponding sidelink connection.

9. The method of claim 8, wherein:
   determining the subset of sidelink connections of the set of sidelink connections corresponding to the same directional receive beam is based at least in part on a receiver spatial configuration associated with the first device.

10. The method of claim 8, wherein the discontinuous reception configuration comprises a pattern of one or more discontinuous receptions cycles, each discontinuous reception cycle of the pattern corresponding to at least one of:
    a different peak quality-of-service metric of a corresponding discontinuous transmission configuration of the one or more other discontinuous transmission configurations, or
    a different traffic throughput metric of the corresponding discontinuous transmission configuration of the one or more other discontinuous transmission configurations, or
    a different spectral efficiency metric of the corresponding discontinuous transmission configuration of the one or more other discontinuous transmission configurations, or a different reference signal received power metric of the corresponding discontinuous transmission configuration of the one or more other discontinuous transmission configurations, or a different reference signal received quality metric of the corresponding discontinuous transmission configuration of the one or more other discontinuous transmission configurations, or any combination thereof.

11. The method of claim 1, further comprising:
transmitting, to a third device, a request message comprising a request to adjust a parameter associated with a corresponding discontinuous transmission configuration associated with the third device, wherein the parameter comprises one or more of a discontinuous transmission period, a discontinuous transmission active duration, or a discontinuous transmission offset, or any combination thereof,
wherein determining the discontinuous reception configuration is based at least in part on the request to adjust the parameter associated with the corresponding discontinuous transmission configuration associated with the third device.

12. The method of claim 1, further comprising:
transmitting the discontinuous transmission configuration and the discontinuous reception configuration to a set of devices, including the second device, for a set of sidelink connections, including the sidelink connection between the first device and the second device.

13. The method of claim 12, wherein transmitting the discontinuous reception configuration comprises:
transmitting the discontinuous transmission configuration and the discontinuous reception configuration to the set of devices, including the second device, for the set of sidelink connections, including the sidelink connection between the first device and the second device, based at least in part on a corresponding device identifier associated with each device of the set of devices.

14. A method for wireless communications by a first device, comprising:
transmitting, to a second device over a sidelink connection, a discontinuous transmission configuration, separate from a discontinuous reception configuration, for the sidelink connection between the first device and the second device, the discontinuous transmission configuration indicative of a periodicity associated with resources in which the first device transmits signaling;
receiving, from the second device, a request message comprising a request to adjust a parameter associated with the discontinuous transmission configuration, wherein the parameter comprises one or more of a discontinuous transmission period, a discontinuous transmission active duration, or a discontinuous transmission offset, or a combination thereof; and
receiving, from the second device over the sidelink connection, the discontinuous reception configuration for the sidelink connection between the first device and the second device, the discontinuous reception configuration based at least in part on the request to adjust the parameter associated with the discontinuous transmission configuration and indicative of a periodicity associated with resources in which the second device receives signaling, wherein the discontinuous transmission configuration and the discontinuous reception configuration are different.

15. The method of claim 14, wherein the discontinuous transmission configuration is exclusively for the sidelink connection.

16. The method of claim 14, further comprising:
transmitting, to the second device, a response message, related to the request to adjust the parameter associated with the discontinuous transmission configuration, based at least in part on the request message.

17. The method of claim 16, wherein the response message indicates one or more of an adjusted discontinuous transmission period, an adjusted discontinuous transmission active duration, or an adjusted discontinuous transmission offset, or any combination thereof.

18. The method of claim 16, wherein the response message indicates a cause for rejecting the request to adjust the parameter associated with the discontinuous transmission configuration.

19. The method of claim 14, wherein transmitting the discontinuous transmission configuration comprises:
transmitting the discontinuous transmission configuration based at least in part on a sidelink connection procedure.

20. The method of claim 19, wherein the sidelink connection procedure comprises a sidelink connection setup procedure.

21. The method of claim 20, wherein the sidelink connection setup procedure comprises a unicast radio resource control sidelink connection setup procedure.

22. The method of claim 21, wherein transmitting the discontinuous transmission configuration comprises:
transmitting the discontinuous transmission configuration in a radio resource control configuration message during the unicast radio resource control sidelink connection setup procedure.

23. The method of claim 14, wherein the discontinuous transmission configuration comprises a pattern of one or more discontinuous transmission cycles.

24. The method of claim 23, wherein the discontinuous transmission configuration including the pattern of the one or more discontinuous transmission cycles comprises a slot offset, a frame offset, the periodicity, or an active duration for transmission of sidelink communications over the sidelink connection, or any combination thereof.

25. The method of claim 14, wherein the discontinuous reception configuration comprises a pattern of one or more discontinuous reception cycles.

26. The method of claim 25, wherein the discontinuous reception configuration including the pattern of the one or more discontinuous reception cycles comprises a slot offset, a frame offset, the periodicity, or an active duration for reception of sidelink communications over the sidelink connection, or any combination thereof.

27. An apparatus for wireless communications at a first device, comprising:
a memory; and
one or more processors coupled with the memory and configured to cause the first device to:
receive, from a second device over a sidelink connection, a discontinuous transmission configuration, separate from a discontinuous reception configuration, for the sidelink connection between the first device and the second device, the discontinuous transmission configuration indicative of a periodicity associated with resources in which the second device transmits signaling;
transmit, to the second device, a request message that comprises a request to adjust a parameter associated with the discontinuous transmission configuration, wherein the parameter comprises one or more of a discontinuous transmission period, a discontinuous transmission active duration, or a discontinuous transmission offset, or a combination thereof; and transmit, to the second device over the sidelink connection, the discontinuous reception configuration for the sidelink connection, the discontinuous reception configuration based at least in part on the request to adjust the parameter associated with the discontinuous transmission configuration and indicative of a periodicity associated with resources in which the first device receives signaling, wherein the discontinuous transmission configuration and the discontinuous reception configuration are different.

28. The apparatus of claim 27, wherein the one or more processors are further configured to cause the first device to:
receive, from a third device, a second discontinuous transmission configuration for a second sidelink connection between the first device and the third device.

29. The apparatus of claim 28, wherein the one or more processors are further configured to cause the first device to:
determine a union of the discontinuous transmission configuration, for the sidelink connection between the first device and the second device, and the second discontinuous transmission configuration, for the second sidelink connection between the first device and the third device,
wherein to determine the discontinuous reception configuration is based at least in part on the union, the discontinuous reception configuration comprising a pattern of one or more discontinuous receptions cycles associated with the sidelink connection between the first device and the second device or the second sidelink connection between the first device and the third device, or both.

30. The apparatus of claim 27, wherein the discontinuous transmission configuration is exclusively for the sidelink connection.

31. The apparatus of claim 27, wherein the one or more processors are further configured to cause the first device to:
receive a set of discontinuous transmission configurations from a set of devices, including the second device, for a set of sidelink connections, including the sidelink connection between the first device and the second device.

32. The apparatus of claim 31, wherein the one or more processors are further configured to cause the first device to:
determine a subset of sidelink connections of the set of sidelink connections that corresponds to a same directional receive beam, the subset of sidelink connections includes the sidelink connection between the first device and the second device,
wherein to determine the discontinuous reception configuration is based at least in part on a union of the discontinuous transmission configuration, for the sidelink connection between the first device and the second device, and one or more other discontinuous transmission configurations, for a corresponding sidelink connection of the subset of sidelink connections between the first device and a corresponding other device associated with the corresponding sidelink connection.

33. The apparatus of claim 32, wherein to determine the subset of sidelink connections of the set of sidelink connections that correspond to the same directional receive beam is based at least in part on a receiver spatial configuration associated with the first device.

34. The apparatus of claim 32, wherein the discontinuous reception configuration comprises a pattern of one or more discontinuous receptions cycles, each discontinuous reception cycle of the pattern corresponding to at least one of:
a different peak quality-of-service metric of a corresponding discontinuous transmission configuration of the one or more other discontinuous transmission configurations, or
a different traffic throughput metric of the corresponding discontinuous transmission configuration of the one or more other discontinuous transmission configurations, or
a different spectral efficiency metric of the corresponding discontinuous transmission configuration of the one or more other discontinuous transmission configurations, or
a different reference signal received power metric of the corresponding discontinuous transmission configuration of the one or more other discontinuous transmission configurations, or
a different reference signal received quality metric of the corresponding discontinuous transmission configuration of the one or more other discontinuous transmission configurations, or any combination thereof.

35. An apparatus for wireless communications at a first device, comprising:
a memory; and
one or more processors coupled with the memory and configured to cause the first device to:
transmit, to a second device over a sidelink connection, a discontinuous transmission configuration, separate from a discontinuous reception configuration, for the sidelink connection between the first device and the second device, the discontinuous transmission configuration indicative of a periodicity associated with resources in which the first device transmits signaling;
receive, from the second device, a request message that comprises a request to adjust a parameter associated with the discontinuous transmission configuration, wherein the parameter comprises one or more of a discontinuous transmission period, a discontinuous transmission active duration, or a discontinuous transmission offset, or a combination thereof; and
receive, from the second device over the sidelink connection, the discontinuous reception configuration for the sidelink connection between the first device and the second device, the discontinuous reception configuration based at least in part on the request to adjust the parameter associated with the discontinuous transmission configuration and indicative of a periodicity associated with resources in which the second device receives signaling, wherein the discontinuous transmission configuration and the discontinuous reception configuration are different.

36. The apparatus of claim 35, wherein the one or more processors are further configured to cause the first device to:
transmit, to the second device, a response message, related to the request to adjust the parameter associated with the discontinuous transmission configuration, based at least in part on the request message.

37. A non-transitory computer-readable medium storing code for wireless communication at a first device, the code comprising instructions executable by one or more processors to cause the first device to:
receive, from a second device over a sidelink connection, a discontinuous transmission configuration, separate from a discontinuous reception configuration, for the sidelink connection between the first device and the second device, the discontinuous transmission configuration indicative of a periodicity associated with resources in which the second device is capable of transmission;

transmit, to the second device, a request message comprising a request to adjust a parameter associated with the discontinuous transmission configuration, wherein the parameter comprises one or more of a discontinuous transmission period, a discontinuous transmission active duration, or a discontinuous transmission offset, or a combination thereof; and transmit, to the second device over the sidelink connection, the discontinuous reception configuration for the sidelink connection, the discontinuous reception configuration based at least in part on the request to adjust the parameter associated with the discontinuous transmission configuration and indicative of a periodicity associated with resources in which the first device is capable of reception, wherein the discontinuous transmission configuration and the discontinuous reception configuration are different.

38. The non-transitory computer-readable medium of claim 37, wherein the instructions are further executable by the one or more processors to cause the first device to:

receive, from a third device, a second discontinuous transmission configuration for a second sidelink connection between the first device and the third device.

39. A non-transitory computer-readable medium storing code for wireless communication at a first device, the code comprising instructions executable by one or more processors to cause the first device to:

transmit, to a second device over a sidelink connection, a discontinuous transmission configuration, separate from a discontinuous reception configuration, for the sidelink connection between the first device and the second device, the discontinuous transmission configuration indicative of a periodicity associated with resources in which the first device is capable of transmission;

receive, from the second device, a request message comprising a request to adjust a parameter associated with the discontinuous transmission configuration, wherein the parameter comprises one or more of a discontinuous transmission period, a discontinuous transmission active duration, or a discontinuous transmission offset, or a combination thereof; and receive, from the second device over the sidelink connection, the discontinuous reception configuration for the sidelink connection between the first device and the second device, the discontinuous reception configuration based at least in part on the request to adjust the parameter associated with the discontinuous transmission configuration and indicative of a periodicity associated with resources in which the second device is capable of reception, wherein the discontinuous transmission configuration and the discontinuous reception configuration are different.

40. The non-transitory computer-readable medium of claim 38, wherein the instructions are further executable by the one or more processors to cause the first device to:

transmit, to the second device, a response message, related to the request to adjust the parameter associated with the discontinuous transmission configuration, based at least in part on the request message.

* * * * *